US009881047B2

(12) United States Patent
Roth et al.

(10) Patent No.: US 9,881,047 B2
(45) Date of Patent: Jan. 30, 2018

(54) SYSTEM AND METHOD OF INTEGRATING TIME-AWARE DATA FROM MULTIPLE SOURCES

(71) Applicant: INTERNATIONAL BUSINESS MACHINES CORPORATION, Armonk, NY (US)

(72) Inventors: Mary A Roth, San Jose, CA (US); Wang-Chiew Tan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/201,159

(22) Filed: Jul. 1, 2016

(65) Prior Publication Data

US 2016/0314165 A1 Oct. 27, 2016

Related U.S. Application Data

(62) Division of application No. 14/107,139, filed on Dec. 16, 2013, now Pat. No. 9,418,124.

(51) Int. Cl.
*G06F 17/00* (2006.01)
*G06F 17/30* (2006.01)

(52) U.S. Cl.
CPC .. *G06F 17/30371* (2013.01); *G06F 17/30557* (2013.01); *G06F 17/30569* (2013.01); *G06F 17/30923* (2013.01)

(58) Field of Classification Search
None
See application file for complete search history.

(56) References Cited

U.S. PATENT DOCUMENTS

| 6,061,503 | A | 5/2000 | Chamberlain | |
|---|---|---|---|---|
| 7,814,142 | B2* | 10/2010 | Mamou | G06F 17/30563 |
| | | | | 709/203 |
| 8,352,398 | B2 | 1/2013 | Chan | |
| 8,712,934 | B2 | 4/2014 | Gross | |
| 9,003,414 | B2 | 4/2015 | Shibayama | |
| 2003/0093706 | A1 | 5/2003 | Cronin | |
| 2004/0230571 | A1* | 11/2004 | Robertson | G06F 17/30312 |
| 2005/0102314 | A1* | 5/2005 | Howard | G06F 17/30595 |

(Continued)

FOREIGN PATENT DOCUMENTS

WO 2007106239 A1 9/2007

OTHER PUBLICATIONS

IBM, Improved time-aware recall mechanism using statistics in Hierarchical Storage Management, ip.com, Oct. 9, 2009, 5pgs.

(Continued)

*Primary Examiner* — Hung Le
(74) *Attorney, Agent, or Firm* — IP AUTHORITY, LLC; Ramraj Soundararajan

(57) ABSTRACT

A time-aware union operator is disclosed for consistent integration of time-aware data, wherein the time-aware union produces a time-aware consistent integrated view of underlying sources according to specified key constraints and policies. The implementation of time-aware union is idempotent, commutative, and associative, thus making it suitable for data integration, and it produces the same integrated outcome, modulo representation of time, regardless of the order in which sources are integrated.

5 Claims, 16 Drawing Sheets

(56) References Cited

U.S. PATENT DOCUMENTS

| | | | |
|---|---|---|---|
| 2008/0058773 A1 | 3/2008 | John | |
| 2008/0114724 A1* | 5/2008 | Indeck | G06F 17/30595 |
| 2009/0254971 A1* | 10/2009 | Herz | G06Q 10/10 |
| | | | 726/1 |
| 2009/0276780 A1 | 11/2009 | Cronin | |
| 2009/0319544 A1* | 12/2009 | Griffin | G06F 17/30557 |
| 2011/0085781 A1* | 4/2011 | Olson | H04N 5/782 |
| | | | 386/296 |
| 2011/0107320 A1 | 5/2011 | Flisakowski | |
| 2011/0246298 A1* | 10/2011 | Williams | G06Q 30/02 |
| | | | 705/14.53 |
| 2012/0089797 A1 | 4/2012 | Shibayama | |
| 2012/0265570 A1* | 10/2012 | Hegazi | G06Q 10/0631 |
| | | | 705/7.12 |
| 2013/0218455 A1* | 8/2013 | Clark | G06Q 50/28 |
| | | | 701/411 |
| 2013/0332194 A1* | 12/2013 | D'Auria | G06F 19/322 |
| | | | 705/3 |
| 2014/0115464 A1* | 4/2014 | Shih | G06Q 10/109 |
| | | | 715/716 |
| 2014/0153594 A1* | 6/2014 | Jhang | B23K 26/06 |
| | | | 372/6 |
| 2014/0214896 A1 | 7/2014 | Hotta | |
| 2015/0237647 A1* | 8/2015 | Glik | H04W 52/0216 |
| | | | 370/311 |

OTHER PUBLICATIONS

V. Barshai et al., Delivering Continuity and Extreme Capacity with the IBM DB2 pureScale Feature, IBM Redbooks, Sep. 7, 2012, 306pgs.

B. Saleh et al., Time aware mining of itemsets, 15th Int'l Symposium on Temporal Representation and Reasoning, Jun. 16-18, 2008, Montreal, Quebec, pp. 93-97.

R. Barga et al., Consistent Streaming Through Time: A Vision for Event Stream Processing, 3rd Biennial CIDR, Jan. 7-10, 2007, Asilomar, CA, pp. 363-374.

D. Bernstein et al., Concurrency Control in Distributed Database Systems, Computing Surveys, 13(2), Jun. 1981, pp. 185-221.

J. Bleiholder et al., Data Fusion, ACM Computing Surveys, 41(1), Art. 1, Dec. 2008, 41pgs.

M. Bohlen et al., Coalescing in Temporal Databases, Proc. of the 22nd VLDB Conf, Mumbai (Bombay), India, 1996, 12pgs.

P. Buneman et al., The Database Wiki Project: A General-Purpose Platform for Data Curation and Collaboration, SIGMOD Record, V40/N3, Sep. 2011, pp. 15-20.

P. Buneman et al., Archiving Scientific Data, Proc. of the 2002 ACM SIGMOD Int'l Conf on Management of Data, Madison, WI, Jun. 2002, 12pgs.

S.-Y.Chien et al., Efficient Management of Multiversion Documents by Object Referencing, Proc. of the 27th VLDB Conf, Roma, Italy, Sep. 11-14, 2001, 10pgs.

J. Clifford et al., On Completeness of Historical Relational Query Languages, ACM TODS, 19(1), Mar. 1994, pp. 64-116.

F. Currim et al., TXSchema: Support for Data- and Schema-Versioned XML Documents, Technical Report TR-91, TimeCenter at Aalborg University, Sep. 8, 2009, 279pgs.

X. L. Dong et al., Data Fusion—Resolving Data Conflicts for Integration, VLDB 2009, Lyon, France, Aug. 24-28, 2009, 5pgs.

T. Green et al., Provenance Semirings, PODS 2007, Beijing, China, Jun. 11-14, 2007, 10pgs.

E. B. Institute, Swiss-Prot Protein Knowledgebase, <http://www.bi.ac.uk/uniprot/, cited Sep. 15, 2012, 2pgs.

C. Jensen et al., Temporal Database Entries for the Springer Encyclopedia of Database Systems, Technical Report TR-90, TimeCenter at Aalborg University, May 22, 2008, 345pgs.

C. Jensen et al., Extending Existing Dependency Theory to Temporal Databases, IEEE Trans. Knowl. Data Eng., 8(4), Aug. 1996, pp. 563-582.

I. Koltsidas et al., Sorting Hierarchical Data in External Memory for Archiving, PVLDB 2008, Auckland, New Zealand, Aug. 23-28, 2008, pp. 1205-1216.

E. Kostylev et al., Combining Dependent Annotations for Relational Algebra, ICDT 2012, Berlin, Germany, Mar. 26-30, 2012, 12pgs.

A. Kumar et al., Designing Access Methods for Bitemporal Databases, IEEE Trans. Knowl. Data Eng., 10(1), 1998, pp. 1-20.

X.P.E. Language, XML Path Expression Language, <http://geneontology.org/, cited Oct. 9, 2012, 2pgs.

M. Liu et al., Sequence Pattern Query Processing over Out-of-Order Event Streams, ICDE 2009, Shanghai, China, Mar. 29-Apr. 2, 2009, pp. 784-795.

A. Marian et al., Change-Centric Management of Versions in an XML Warehouse, Proc. of the 27th VLDB Conf, Roma, Italy, Sep. 11-14, 2001, pp. 581-590.

H. Moon et al., Managing and Querying Transaction-time Databases under Schema Evolution, VLDB 2008, Auckland, New Zealand, Aug. 24-30, 2008, pp. 882-895.

H. Muller et al., XArch: Archiving Scientific and Reference Data, ACMSIGMOD 2008, Vancouver, BC, Canada, Jun. 9-12, 2008, pp. 1295-1298.

L. Popa et al., Translating Web Data, VLDB 2002, Hong Kong, China, Aug. 20-23, 2002, pp. 598-609.

M. Roth et al., Data Integration and Data Exchange: It's Really About Time, CIDR 2013, Asilomar, CA, USA, Jan. 6-9, 2012, 8pgs.

XARCH: The <XML> Archiver, <http://xarch.sourceforge.net/index.html>, 2pgs.

H. Zhang et al., Recognizing Patterns in Streams with Imprecise Timestamps Technical Report, VLDB 2010, Singapore, Sep. 13-17, 2010, 15pgs.

H. Zhu et al., Effective Data Integration in the Presence of Temporal Semantic Conflicts, TIME 2004 Proc. of 11th Int'l Sym. on Temporal Representation and Reasoning, Tatihou Island, Normandie, France, Jul. 1-3, 2004, pp. 109-114.

G.O. Database, Gene Ontology Database, <http://www.w3.org/TR/xpath/>, cited Oct. 1, 2012, 34pgs.

The EDGAR Public Dissemination Service, <http://www.sec.gov/edgar.shtml, 1pg.

* cited by examiner

Starttime ::=Int;   endtime ::=Int | now;

ActRep ::=SetOf Rcd[asof:(starttime,endtime), reported:(starttime,endtime)];

person::=Pair[C:ActRep, stocksHeld: SetOf
         Pair[C:ActRep, stock:Rcd[ticker*:Str, shares: SetOf* Pair[C:ActRep, value*:Int]]];

First two reports from "SEC filings" of Figure 1:

Pair[C:-, stocksHeld:{

Pair[C:-, stock:Rcd[ticker: "OLP", shares:{Pair[C:{ Rcd[asof:(7/01-now), reported:(7/01-now)]}, value:396043] }]}

Pair[C:-,stocksHeld:{

Pair[C:-,stock:Rcd[ticker: "OLP", shares:{Pair[C:{ Rcd[asof:(8/25-now), reported:(8/26-now)]},value:13415] }]}

First entry of OLP shares under "Stocks held" of Figure 1:

Pair[C:-, stocksHeld:{

Pair[C:-, stock:Rcd[ticker: "OLP", shares:{Pair[C:{Rcd[asof:(7/1-8/20), reported:(7/01-now)]}, Rcd[asof:(8/26-now), reported:(8/30-now)]},value:396043] }]}

FIG. 2A ticker: OLP
shares:

| c | value |
|---|---|
| (7/01-8/20, 7/01-now), | 396043 |
| (8/26-now, 8/30-now) | 1322179 |
| (8/20-8/23, 8/30-now) | 141 |
| (8/23-8/25, 8/24-now) | 13415 |
| (8/25-8/26, 8/26-now) | | ticker: BRT
shares:

| c | value |
|---|---|
| (7/09-7/14, 8/22-now) | 1820 |
| (7/14-now, 8/02-now) | 0 |

Policy 1: Favor latest asof time ticker: OLP
shares:

| c | value |
|---|---|
| (7/01-8/20, 7/1-now), | 396043 |
| (8/26-now, 8/30-now) | 1322179 |
| (8/20-8/26, 8/30-now) | | ticker: BRT
shares:

| c | value |
|---|---|
| (7/09-now, 8/22-now) | 1820 |

Policy 2: Favor latest reported time ticker: OLP
shares:

| c | value |
|---|---|
| (7/01-8/20, 7/01-now), | 396043 |
| (8/26-now, 8/30-now) | 1322179 |
| (8/20-8/26, 8/30-now) | | ticker: BRT
shares:

| c | value |
|---|---|
| (7/09-7/14, 8/22-now) | 1820 |
| (7/14-now, 8/02-now) | 0 |

Policy 3: Favor corrections, followed by latest asof time

FIG. 2B

Algorithm 1: Basic Time-aware Union ($\uplus$)

1 Input: A schema $S$ and two instances $T_1$ and $T_2$ of $S$.
2 Output: A merged instance of $T_1$ and $T_2$ according to constraints given by $S$ and a fixed policy.

3 case $T_1$ and $T_2$ are SetOf Pair types
4     if $(T_1 == \emptyset)$ or $(T_2 == \emptyset)$ then
5         return $T_1 \cup T_2$;
6     else
7         Let $T'_1$ be the set of all elements in $T_1$ whose keys do not occur in $T_2$;
8         Let $T'_2$ be the set of all elements in $T_2$ whose keys do not occur in $T_1$;
9         Let $T' = \emptyset$;
10        for every $t_1 \in T_1$ and $t_2 \in T_2$ such that $t_1$ and $t_2$ have the same key value do
11            $T' = T' \cup (t_1 \uplus t_2)$;
12        return $T'_1 \cup T'_2 \cup T'$;

13 case $T_1$ and $T_2$ are SetOf* Pair types
14     return fuse$(T_1, T_2)$;

15 case $T_1$ and $T_2$ are both Rcd types
16     Let $T_1$ be Rcd$[p_1 : u_1, \ldots, p_m : u_m]$;
17     Let $T_2$ be Rcd$[q_1 : v_1, \ldots, q_n : v_n]$;
18     Wlog, we assume that $p_i = q_i$, where $1 \leq i \leq k$,
19     and $k \leq \min(m, n)$.
20     return Rcd$[p_1 : (u_1 \uplus v_1), \ldots, p_k : (u_k \uplus v_k), p_{k+1} : u_{k+1}, \ldots, p_m : u_m, q_{k+1} : v_{k+1}, \ldots, q_n : v_n]$;

21 case $T_1$ and $T_2$ are both Pair$[C : \tau, -]$ types
22     return fuse$(T_1, T_2)$;
23 return Error; // $T_1$ and $T_2$ have different types

FIG. 8A

Algorithm 2: fuse($T_1, T_2$)

1. Input: Two pairs $T_1$ and $T_2$ of the same type; either Pair[$C : \tau_1, l : \tau_2$] or SetOf* Pair[$C : \tau_1, l : \tau_2$].
2. Output: A pair of type Pair[$C : \tau_1, l : \tau_2$] or a set of pairs of type SetOf* Pair[$C : \tau_1, l : \tau_2$] that represents the combined knowledge of $T_1$ and $T_2$.
3. case $T_1$ and $T_2$ are Pair types
4.     Let $T_1$ denote Pair[$C : c_1, l : v_1$] and $T_2$ denote Pair[$C : c_2, l : v_2$].
5.     Let $(c'_1, c'_2) = \text{adjust}(c_1, c_2)$;
6.     if $v_1$ and $v_2$ are of atomic types then
7.         if ($v_1 == v_2$) then
8.             return Pair[$C : (c'_1 \cup c'_2), l : v_1$];
9.     else
10.         return Pair[$C : (c'_1 \cup c'_2), l : v_1 \uplus v_2$];
11. case $T_1$ and $T_2$ are SetOf* Pair types
12.     for each $p_1 \in T_1$ do
13.         for each $p_2 \in T_2$ do
14.             Let $p_1$ be Pair[$C : c_1, l : v_1$];
15.             Let $p_2$ be Pair[$C : c_2, l : v_2$];
16.             Let $(c'_1, c'_2) = \text{adjust}(c_1, c_2)$;
17.             Replace $p_1$ with Pair[$C : c'_1, l : v_1$];
18.             Replace $p_2$ with Pair[$C : c'_2, l : v_2$];
19.     Let $T'_1$ be the set of all pairs in $T_1$ whose keys do not occur in $T_2$;
20.     Let $T'_2$ be the set of all pairs in $T_2$ whose keys do not occur in $T_1$;
21.     Let $T_3$ be $\bigcup \text{fuse}(p_1, p_2)$ such that $p_1 \in T_1$, $p_2 \in T_2$, and $p_1$ and $p_2$ have the same key.
22.     return $T'_1 \cup T'_2 \cup T_3$;

FIG. 8B

```
Algorithm 3: adjust(c₁, c₂)
1  Input: In general, c₁ and c₂ are temporal contexts of type SetOf
   Rcd[a₁ : τ₁,...,aₘ : τₘ], where m ≥ 1. For simplicity, we assume
   that c₁ and c₂ are bi-temporal contexts of the form SetOf Rcd[asof:τ₁,
   rep:τ₂]. The time records within each temporal context are assumed to
   be non-overlapping.
2  Output: A pair of temporal contexts based on the retroactive
   adjustment policy on the 'asof' time dimension.
3  case c₁ and c₂ SetOf Rcd types
4      for each e₁ ∈ c₁ do
5          for each e₂ ∈ c₂ do
6              Let (e'₁, e'₂) = adjust(e₁, e₂);
7              Replace e₁ with e'₁;
8              Replace e₂ with e'₂;
9      return (c₁, c₂);
10 case e₁ and e₂ are Rcd types
11     Let e₁ be Rcd[asof:(l₁, r₁), rep:(l₂, r₂)];
12     Let e₂ be Rcd[asof:(l'₁, r'₁), rep:(l'₂, r'₂)];
13     In what follows, null(e₁) and null(e₂) represents
14         Rcd[asof:(l₁, l₁), rep:(l₂, l₂)] and, resp.,
15         Rcd[asof:(l'₁, l'₁), rep:(l'₂, l'₂)].
16     if e₁ and e₂ do not overlap then
17         return (e₁, e₂);
18     if (l₁ == l'₁) then
19         if (l₂ == l'₂) then
20             return (e₁, null(e₂)) or (null(e₁), e₂) deterministically
                 based on additional information about the data
                 associated with these contexts.
21         else
22             if (l₂ < l'₂) then
23                 return (e₁, null(e₂)); // "reject" e₂
24             else
25                 return (null(e₁), e₂); // "reject" e₁
26     else
27         Let e'₁ = ∅;
28         Let e'₂ = ∅;
29         if (l₁ < l'₁) then
30             if (r₁ > l'₁) then
31                 // e₁ is being truncated
32                 e'₁ = e'₁ ∪ {Rcd[asof:(l₁, l'₁), rep:(l₂, r₂)]};
33             else
34                 e'₁ = e₁; // e₁ remains unchanged
35             e'₂ = e₂; // e₂ remains unchanged
36         else
37             // This is a symmetric case of the above where l'₁ < l₁.
38             // The code is omitted.
39         return (e'₁, e'₂);
```

FIG. 8C

Source and favor start time victim policies and tiebreaker by ID

- Based on an ordered list of entities (1)

```
victim_choose_by_source(e_i, e_j) {
    If i=j return error.
    Let L be an array of
        integers l=1,...n
        without duplicates.
    If L(i) < L(j) return j
    Else return victim_choose_earliest(e_i, e_j)
}
```

- Favor latest start time in order of dimension. (2)

```
Victim_choose_earliest(e_i, e_j) {
    Let S be an array of sources 1,...,m without duplicates.
    Let sk represent the source of ek such that sk in S.
    If i=j return.
    Let tk = (x1k, y1k) (x1k, y2k) (x2k, y1k) (x2k, y2k)
        represent the 2 dimensional time interval of ek.
    If (x1i < x1j) then
        return e1
    Else If (x1i > x1j) then
        return e2
    Else If (y1i < y1j) then
        return e1
    Else If (y1i > y1j) then
        return e2
    Else return error.
}
```

FIG. 9

Right-adjust policy

- Example of valid reduce policy coupled with victim policy (2)
- The reduce policy is for entities associated with a 2-dim time interval, and reduces along one of two dimensions in case of a time conflict. The lower left corner of the time interval is never modified.

```
reduce(e_i,e_j) {
   If i=j return.
   Let tk = (x1k, y1k) (x1k, y2k) (x2k, y1k) (x2k, y2k)
represent the 2 dimensional time interval of ek.
   If ti and tj do not overlap then return
   Else If (x1i < x1j) then
        adjust ei's 2-dim time interval to be
        (x1i, y1i)(x1i, y2i) (x1j, y1i) (x1j, y2j)
   Else If (x1i = x1j) then
        If (y1i < y1j) then
             adjust ei's 2-dim time interval to be
             (x1i, y1i) (x1i, y1j) (x2i, y1i) (x2i, y1j)
        Else
             there is complete overlap,
             so mark ei as rejected
}
```

SYSTEM AND METHOD OF INTEGRATING TIME-AWARE DATA FROM MULTIPLE SOURCES

RELATED APPLICATIONS

This application is a divisional of U.S. application Ser. No. 14/107,139 filed Dec. 16, 2013, which is allowed.

BACKGROUND OF THE INVENTION

Field of Invention

The present invention relates generally to the field of data integration and data exchange. More specifically, the present invention is related to a system and method of integrating time-aware data from multiple sources.

Discussion of Related Art

With the amount and variety of data available, such as curated databases, enterprise data, and publicly available data over the Internet, it is rare for information about an entity to be completely contained and managed by a single data source. There is often great value in combining data from multiple sources, or in combining various versions of data reported by the same source over time, to produce a more complete understanding. For example, patients typically visit multiple medical professionals/facilities over the course of their lifetime, and often even simultaneously. While it is important for each medical facility to maintain medical history records for its patients, there is even greater value for both the patient and the medical professionals to have access to an integrated profile derived from the history kept by each institution. Likewise, a potential employer would find value in combining a job applicant's resume with other data, such as public profile data or even previous versions of a resume.

These examples illustrate that the time aspects of data can be critically important. It is important to know, for example, if two different drugs with adverse interaction have been prescribed to a patient in the same time period. Likewise, if different sources report that a job applicant has held multiple positions within the same time period, it would be useful for a hiring manager to know the order in which the titles were held in order to infer if the applicant was promoted, demoted, or perhaps provided an embellished resume.

Several challenges arise when integrating time-aware data, which refers to data that contain implicit time-specific information, such as the date of a prescription, or explicit time information, such as the version number of an instance. First, the time aspect associated with the data is often imprecise. A facility may report that the patient was treated for a condition on a specific date. From this information, one can infer that the patient must have had the condition on the day he/she was seen, but one cannot say if the patient still has the condition, or for how long prior to or after the visit that he/she had the condition. When combined with information from other visits to the same or other clinics, it is possible to incrementally create a more and more accurate medical history for the patient.

Second, as in traditional data integration, inconsistencies may arise with respect to certain specified constraints when data from multiple sources are combined together. An added complexity arises from the need to handle certain constraints across time (see paper to C. S. Jensen et al., "Extending existing dependency theory to temporal databases," *IEEE Trans. Knowl. Data Eng.*, 8(4): 563-582, 1996). For example, while it may be true that an employee may only receive one salary package from an employer at a time, it is possible for the employee to simultaneously receive multiple salary packages if he/she is employed by multiple companies at the same time. As another example, reports filed with the U.S. Securities and Exchange Commission (SEC) or corporate press releases may report that an executive held a particular title on a given day, but it does not provide information about when that title was first held, or even if it is still held after the report or press release is made public. Another data source (or even the same data source at a different point in time) may report that the executive was employed by the company at a date later than the date the first source reported his or her title. Both reports give imprecise information. What can be inferred about the employment history of the executive? Should it be assumed that he/she had been employed by the company as of the (earlier) date associated with his title, or should that value be disregarded in favor of the (later) date reported by the second source?

When integrating information about the same entity from multiple sources over time, the challenge is to maintain time consistency of the facts that are known about the entity, given that such facts are learned from different sources at different times, and the time associated with them may be imprecise. Ideally, the integration process should respect schema constraints and functional dependencies across time, and possess idempotent, commutative and associative properties to ensure a time-consistent profile of the entity, regardless of the order in which the facts are learned.

Current techniques do not provide such a guarantee. A standard bi-temporal database, for example, could be used to track when facts are learned, but it does not guarantee that the most current understanding of the facts will be the same, regardless of the order in which updates occur. Consider the following example:

UPDATE STOCKHOLDINGS FOR PORTION OF BUSINESS_TIME
FROM '08/23/2010' to CURRENT DATE
SET SHARES=141,
WHERE NAME='Freddy Gold'
UPDATE STOCKHOLDINGS FOR PORTION OF BUSINESS_TIME
FROM '08/20/2010' to CURRENT DATE
SET SHARES=396043,
WHERE NAME='Freddy Gold'

If the updates are executed in this order, the database will record that the current understanding is that Freddy Gold has 396043 shares of stock since 8/23, however, if the order of the statements is reversed, the database will record that the current understanding is that Freddy Gold has 141 shares of stock, and this has been true since 8/20. While both facts may have been at different points in time, it is unclear how many shares of stock Freddy has today. Is the second update a correction to the first, or just a fact that arrived out of order? Such subtleties and challenges associated with the problem of consistently integrating time-aware data are explored with a concrete example next.

Motivating Example

FIG. 1 shows a simplified form of a real example where information about Freddy Gold is integrated from data extracted from several sources, including different reports filed with the SEC (Forms 10K and Forms 3/4/5) that are available via the EDGAR database (see SEC website regarding The EDGAR Public Dissemination Service), different versions of resumes, corporate websites, and news articles available electronically. For simplicity, it is assumed that each row shown on the left of FIG. 1 represents a separate filing or a version, even though in general, a filing or version may contain many rows of data.

For example, "SEC filings" in FIG. 1 show 7 facts taken from 7 reports filed with the SEC, each of which indicates the number of shares of a particular stock (OLP and BRT) held by Freddy Gold during the second half of 2010. The first row is a report that is filed on 7/01 and indicates Freddy owned 396043 OLP shares on 7/01. Though the date associated with the filing only records the day on which the fact was known to be true, it is reasonable to assume that the data in the filing are true until new information is received, such as from the report shown on the second row that indicates Freddy owned 13415 OLP shares on 8/25.

At the same time, data extracted from different versions of corporate websites and news articles contain partial information about Freddy's employment history, and different versions of Freddy's resume give partial information about Freddy's education and employment history. How can the given information be best reconciled to compose a time-consistent profile so that one could understand his job history or how many shares of OLP he owned, for example on 8/24? Next, an answer to this question is addressed.

A first examination of the SEC reports indicates that it would seem reasonable to assume that Freddy had 141 OLP shares on 8/24, since the third report indicates that this was the case since 8/23. However, the 4th and 5th reports filed at the later date of 8/30 indicate that Freddy had 1322179 shares of OLP on 8/20 and this number only changed on 8/26 to 396043 shares. So, did Freddy own 141 shares or 1322179 shares on 8/24? Since the 4th and 5th filings were reported at a later date (i.e., it is more recent information that 'corrects' the earlier information), it would seem reasonable to assume that Freddy had 1322179 shares on 8/24. If the same logic is applied to the $6^{th}$ and $7^{th}$ filings about his stock holdings in BRT, then Freddy must own 1820 shares of BRT on 7/14. Alternatively, if the reports simply arrived out of order, then Freddy owned 141 shares of OLP on 8/24 and 0 shares of BRT on 7/14.

The discussion above raises subtleties that may arise when interpreting and integrating time-specific information under a constraint that is implicit in this example; Freddy can hold only one quantity of shares of a specific stock at any point in time. Hence, when conflicts arise (i.e., when there are at least two different possible number of shares of a stock held by Freddy at some point in time), one needs to resolve the conflict and decide the "right" number of shares under Freddy's integrated profile. One possible interpretation is shown on the right of FIG. 1. As shall be explained later, other interpretations of Freddy's stock holdings are possible depending on how the given dates are interpreted.

This example points out the need for an extensible framework to support different policies for integrating time-aware data. Regardless of the strategy used to resolve conflicting information, the integrated outcome (modulo syntactic representation of time) should be agnostic to the order in which data sources are integrated.

The discussion below describes known prior art techniques for data integration and data exchange.

Data Integration and Data Exchange

Even though tremendous progress on data integration and data exchange has been made in the past few decades, prior techniques and systems for data integration and data exchange are largely agnostic to time, and hence, they cannot be immediately applied to satisfactorily build an integrated archive over time. In fact, assuming that all extracted data are placed in a format ready for integration, the state-of-the-art data integration and data exchange systems still cannot be used to automatically derive a consistent understanding of Freddy Gold's longitudinal profile, such as what is shown on the right of FIG. 1 and FIG. 2B. It would require non-trivial extensions and in particular, the use of ad hoc functions to create a temporally consistent view of the data sources under known constraints. Except for the paper to H. Zhu et al., "Effective data integration in the presence of temporal semantic conflicts," *Intl. Symp. on Temporal Representation and Reasoning*, TIME, pp. 109-114, 2004, which provides a discussion on three types of temporal heterogeneity that need to be resolved when integrating data across time, the problem of integrating and exchanging data across time has not been systematically and thoroughly addressed in prior work in this area.

What is needed is a systematic extension of a data exchange system that can be used to integrate and exchange data across time. A data exchange specification is a triple (S, T, Σ), where S is a source schema and T is the target schema and Σ is a set of schema mappings, which are high-level declarative specifications of the relationship between instances of two schemas. Given a source instance I of S, the goal of data exchange is to materialize a target instance J of T so that I and J together satisfy Σ. The generic architecture of a data exchange system consists of a module that takes the specification and compiles it into executable code. The executable code can then be applied to I to obtain J (e.g., see the paper to L. Popa et al., "Translating Web Data," *VLDB*, pp 598-609, 2002). The target instance can also be obtained by applying the chase procedure on I with respect to the specification. A fundamental assumption that is often implicit in the data exchange framework is that the target instance is created as a union of facts that are obtained from the result of the data exchange. After the exchange, all target facts are unioned to obtain J, where under set union, the set of all identical facts are fused into one. When conflicting facts arise in the presence of functional dependencies in the target (which are modeled as target equality generating dependencies), the data exchange will fail and no target instance will be materialized. Users are often left to deal with the inconsistencies manually or apply data cleaning techniques to resolve inconsistencies. There are no known techniques for resolving inconsistencies in data across time. In fact, ad hoc functions are typically added to manage inconsistencies with respect to time during data integration.

(Bi)Temporal Databases

There is a large body of work on bi-temporal databases. Chapter 14 in the book by J. Chomicki et al., *Temporal Databases*, Foundations of Artificial Intelligence, Elsevier, 2005 and the book C. S. Jensen et al. Eds, *Temporal Database Entries for the Springer Encyclopedia of Database Systems*, Springer, 2009 provide a comprehensive overview of related work and concepts in this area. Techniques in bi-temporal databases cannot be immediately applied to integrate and exchange data across time. First, bi-temporal databases have only two specific notions of time, namely valid-time and transaction-time (which are also known as application-time and, respectively, system-time). Valid-time denotes that time at which a tuple is valid in the real-world, while transaction-time denotes the time updates are entered into the database and hence, it can only increase as updates are entered. However, the order of integration, whether according to asof or reported time, may not respect transaction-time semantics. The work of M. Roth and W-C Tan in the paper, "Data integration and data exchange: It's really about time," In *CIDR*, 2013 provides a detailed example and discussion on why bi-temporal databases cannot be applied. Second, the valid-transaction-time semantics is not always the "right" semantics. In fact, none of the integrated archives shown in FIG. 2B corresponds to the result that one would obtain with valid-transaction time semantics. Different applications may require different semantics to integrate data across time. The "correct" semantics may depend only on the application at hand and this running example points out the need to provide an extensible framework that goes beyond valid-transaction-time semantics so that alternative semantics can be adopted as needed. In principle, additional attributes can be added to a relation to capture application-specific time-related information that may exist in the data (such as asof and reported time). However, such additions will necessitate the use of (ad hoc) triggers, user-defined functions, or stored procedures to manipulate time in the way that is desired. Finally, except for the paper to F. Currim et al., "τx schema: Support for data- and schema-versioned xml documents," Technical Report TR-91, TimeCenter at Aalborg University, 9/2009 and the paper to H. J. Moon et al., "Managing and querying transaction-time databases under schema evolution," *PVLDB*, 1(1): 882-895, 2008, most implementations of bi-temporal databases are relational. The work identified above of F. Currim et al. and H. J. Moon et al. (which stores relational data in XML) follow bi-temporal valid-transaction-time semantics and significant logic will need to be added to allow time to be manipulated in alternative ways.

Archiving, Versioning, and Annotation Systems

Different techniques for archiving data exist, going back to multi-version control systems (see the paper to P. A. Bernstein et al., "Concurrency control in distributed database systems," *ACM Comput. Surv.*, 13(2): 185-221, 6/1981) with certain ACID guarantees, diff-based version management systems (e.g., see the paper to A. Marian et al., "Change-centric management of versions in an xml warehouse," *VLDB*, pp. 581-590, 2001), or reference-based approaches (e.g., see the paper to S-Y Chien et al., "Efficient management of multiversion documents by object referencing," *VLDB*, pp. 291-300, 2001) for hierarchical data, to techniques that compact versions based on key constraints (see the papers to P. Buneman et al., "The database wiki project: A general purpose platform for data curation and collaboration," *SIGMOD Record*, 40(3): 15-20, 2011, and Archiving scientific data, *ACM TODS*, V29, pp. 2-42, 2004, and the paper to I. Koltsidas et al., "Sorting hierarchical data in external memory for archiving," *PVLDB*, 1(1): 1205-1216, 2008). Archiving can be construed as a form of data integration across versions of data. Techniques based on key constraints have the advantage over version or reference-based approaches because they explicitly track the evolution of entities over time. However, all the systems above apply only to a single dimension of time (i.e., versions of data) and cannot be immediately generalized to manage multiple dimensions of time. Time-specific information can be regarded as a type of annotation and the "additive" commutative monoid of a provenance semiring can be applied to obtain a union of such annotated data sources (see the paper to T. J. Green et al., "Provenance semirings," PODS, pp. 31-40, 2007 and the paper to E. V. Kostylev et al., "Combining dependent annotations for relational algebra," *ICDT*, pp. 196-207, 2012). However, a mechanism for understanding how conflicts can be resolved when combining annotations is still required to ensure that constraints in the target schema are satisfied.

Data Conflict Resolution

Data conflict resolution for integration is a well-studied area (see the paper to J. Bleiholder et al., "Data fusion," *ACM Comput. Surv.*, 41(1): 1-41, 2009 and the paper to X. L. Dong et al., "Data fusion—resolving data conflicts for integration," *PVLDB*, 2(2): 1654-1655, 2009). However, existing techniques for data conflict resolution are agnostic to time.

Complex Event Processing, Streams, and Uncertain Data

Complex event processing and data streams is another area of related research (see the paper to R. S. Barga et al., "Consistent streaming through time: A vision for event stream processing," *CIDR*, pp. 363-374, 2007). The goal of such systems is to make decisions based on continuously streaming data that may arrive in order or out-of-order (see the paper to M. Liu et al., "Sequence pattern query processing over out-of-order event streams," *ICDE*, pp. 784-795, 2009), and for which the time element associated with data values may be known with certainty or may be imprecise (see the paper to H. Zhang et al., "Recognizing patterns in streams with imprecise timestamps," *Proc VLDB Endow.*, 3(1-2): 244-255, 9/2010). Data integration scenarios introduce requirements to model constraints of time-aware data, and to enable specification of application-specific policies to resolve violations as part of the integration process to produce a consistent integrated result.

Embodiments of the present invention are an improvement over prior art systems and methods.

SUMMARY OF THE INVENTION

A novel framework for time-aware data integration called Chronicle is introduced comprising: a data model to capture both time and data as first-class citizens, and a time-aware union operator that can consistently integrate time-aware data under this data model. The present invention's data model captures time around entities, where entities are identified through keys, and is, thus, immediately admissible to tracking the history and evolution of entities. The present invention's framework naturally allows time-aware union to manipulate multiple dimensions of time under different policies and key constraints.

The time-aware union algorithm is presented under two time dimensions and it is shown how the current implementation under a given policy is idempotent, commutative, and associative, making it extremely well-suited for the purpose of data integration. In particular, it produces the same integrated outcome, modulo representation of time, regardless of the order in which sources are integrated. Different flavors of time-aware union are applied on several real-world data sources and the feasibility of the time-aware union operator is shown along with its efficiency in terms of execution time and storage, where it lends itself well to parallelization.

In one embodiment, the present invention provides a computer-implemented method for processing a set of data records having time conflicts, the data records representing respective versions of an entity for which there can be only one preferred value at any given point in time, wherein each of the data records has an n-dimensional time record, the computer-implemented method comprising: defining a policy from among a plurality of candidate policies, the defined policy designed to resolve time conflicts between those data records having time conflicts; comparing all data records in a cumulative, pair-wise fashion; identifying time-based conflicts between pairs of records and identifying time-conflicted pairs; determining which record in every time-conflicted pair of records is to be adjusted in accordance with the defined policy; adjusting the time interval of every determined record in accordance with the defined policy; and outputting a modified set of data records having the adjusted time intervals, wherein (i) the modified set of data records contains no time conflicts and (ii) the adjusted time intervals in the modified set of data records do not depend on the order in which the data records are processed by the computer-implemented method.

In another embodiment, the present invention provides a system for processing a set of data records having time conflicts, the data records representing respective versions of an entity for which there can be only one preferred value at any given point in time, wherein each of the data records has an n-dimensional time record, the system comprising: one or more processors; and a memory comprising instructions which, when executed by the one or more processors, cause the one or more processors to: define a policy from among a plurality of candidate policies, the defined policy designed to resolve time conflicts between those data records having time conflicts; compare all data records in a cumulative, pair-wise fashion; identify time-based conflicts between pairs of records and identify time-conflicted pairs; determine which record in every time-conflicted pair of records is to be adjusted in accordance with the defined policy; adjust the time interval of every determined record to be adjusted in accordance with the defined policy; and output a modified set of data records having the adjusted time intervals, wherein (i) the modified set of data records contains no time conflicts and (ii) the adjusted time intervals in the modified set of data records do not depend on the order in which the data records are processed by the computer-implemented method.

In yet another embodiment, the present invention provides a non-transitory computer-readable medium for processing a set of data records having time conflicts, the data records representing respective versions of an entity for which there can be only one preferred value at any given point in time, wherein each of the data records has an n-dimensional time record, the computer-readable medium comprising computer readable program code which, when executed by a computer, cause the computer to computer-implemented method, the medium comprising computer readable program code: receiving inputs defining a policy from among a plurality of candidate policies, the defined policy designed to resolve time conflicts between those data records having time conflicts; comparing all data records in a cumulative, pair-wise fashion; identifying time-based conflicts between pairs of records and identifying time-conflicted pairs; determining which record in every time-conflicted pair of records is to be adjusted in accordance with the defined policy; adjusting the time interval of every determined record in accordance with the defined policy; and outputting a modified set of data records having the adjusted time intervals, wherein (i) the modified set of data records contains no time conflicts and (ii) the adjusted time intervals in the modified set of data records do not depend on the order in which the data records are processed by the computer-implemented method.

The present invention provide a computer based method comprising the steps of: receiving an input schema S; receiving two instances, $T_1$ and $T_2$, each of which conforms to the input schema, S; computing a merged instance of $T_1$ and $T_2$, $T_1 \uplus T_2$, as an instance that also conforms to S such that every path in $T_1$ or $T_2$ can be found in $T_1 \uplus T_2$, every path in $T_1 \uplus T_2$ can be found in $T_1$ or $T_2$, and a temporal context associated with an element in any path in $T_1 \uplus T_2$ is a result of adjusting temporal contexts of corresponding elements in $T_1$ and/or $T_2$ under the same path according to a given adjustment policy, the given adjustment policy designed to resolve time conflicts between data records having time conflicts, where the merged instance $T_1 \uplus T_2$ provides an integrated view of instances $T_1$ and $T_2$ by fusing identical elements in instances $T_1$ and/or $T_2$ together and providing an interpretation of their corresponding temporal contexts according to the given adjust policy; and outputting the merged instance $T_1 \uplus T_2$.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 2A illustrates an example of a Chronicle schema.

FIG. 2B illustrates an integrated profile based on different adjustment policies.

FIGS. 8A-C illustrate the various algorithms as per the teachings of the present invention.

FIG. 9 illustrates examples of victim policies.

FIG. 10 shows an example of the right-adjust policy.

DESCRIPTION OF THE PREFERRED EMBODIMENTS

Figure 1:
FIG. 1 illustrates a simplified form of a real example where information is integrated from data that are extracted from several sources.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Time-Aware Data Model

The Chronicle Data Model:

Schemas defined under the Chronicle data model are described through the following grammar.

$\tau ::= \text{Str} | \text{now} | (\tau,\tau) | \text{SetOf } \tau | \text{SetOf}^* \tau$
$\quad \text{Rcd}[l_1:\tau_1, \ldots, l_n:\tau_n] | \text{Pair}[l_1:\tau_1, l_2:\tau_2]$ The record type, $\text{Rcd}[l_1:\tau_1, \ldots, l_n:\tau_n]$ has fields (or attributes) $l_1, \ldots, l_n$ and corresponding types $\tau_1, \ldots, \tau_n$. The Pair type, $\text{Pair}[l_1:\tau_1, l_2:\tau_2]$, is a special record type with only two fields $l_1$ and $l_2$ and, respectively, types $\tau_1$ and $\tau_2$.

To keep the grammar simple, only two atomic types are used: Str and Int. The symbol now is a special keyword denoting the current time. $(\tau,\tau)$ is used to specify a time interval denoting the start and end times. By convention, the time interval (1,10) denotes the time interval beginning at 1 and ending before 10. As there can be multiple types of time, such as the 'asof' and 'reported' time in the running example, each such type is called a temporal dimension (see Chapter 14 in the book to J. Chomicki et al., *Temporal databases*, Foundations of Artificial Intelligence, Elsevier, 2005). Note that for realistic illustration, dates are used instead of integers as time in the running example.

Concretely, a schema S under the Chronicle data model has the following form: $S::=\text{Pair}[C:\tau_1, l:\tau_2]$. where $\tau_1$ represents the type of a temporal context and $\tau_2$ is a SetOf (or SetOf*) Pair, Rcd, or Pair type. The case where $\tau_2$ is an atomic type is ruled out, as such Pairs can only be defined in the context of a SetOf (or SetOf*) type. For example, $\text{Pair}[C:\tau_1, l_1:\text{SetOf Pair}[C:\tau_1, l':\text{Str}]]$. In fact, unless an atomic type is defined as the type of a key field, it is assumed that they are always defined as the second component of a Pair type, and in the context of a SetOf or SetOf* type.

Temporal Context:

Intuitively, the temporal context of an element is a set of n-dimensional time intervals that is used to capture the times, under the different time dimensions, when this element exists. In order to avoid confusion with the term "elements" in the current setting, the term temporal context is used instead of the term temporal element used in the literature (see the paper to S-Y Chien et al., "Efficient management of multiversion documents by object referencing," *VLDB*, pp. 291-300, 2001).

In Chronicle, a temporal context is defined using the type SetOf (or SetOf*) $\text{Rcd}[a_1:(l_1,r_1), \ldots, a_n:(l_n,r_n)]$, where $a_i$, $1 \leq i \leq n$, denotes the name of a time dimension. The interval $(l_i,r_i)$ denotes the time interval associated with $a_i$. A temporal context must always be defined as the first field of a Pair type. Conversely, a Pair type must have a temporal context as its first field. In other words, a Pair type is used to associate a temporal context with the element that is defined as the second field of the Pair. For convenience, it is assumed that every Rcd, SetOf, SetOf*, or atomic type, is associated with a temporal context through a Pair type.

Keys:

A key must be specified for elements of a SetOf (or SetOf*) type. A consequence of this requirement is that every element of an instance of a Chronicle schema can be uniquely identified by a sequence of element names or key values along the path from the root of the instance to that element. Intuitively, a path is a sequence of element names starting from the root.

Example

FIG. 2A shows a definition of a temporal context labeled as 'ActRep' It is a set of records, and each record has two fields corresponding to the time dimensions 'asof' and 'reported'. The value of each time dimension is a pair of integers, representing a time interval.

The middle of the same figure shows how the binary relation stock(ticker*, shares), which occurs as "SEC filings" in the source and as "Stocks held" in the target (see FIG. 1), is defined under the present model. The schema represents the relation as a set of pairs of (temporal context, record) under the field "stocksHeld", where the temporal context captures the time periods under which the record holds. Each record has two fields. The field "ticker", marked with "*", is the key attribute. This implies that at any point in time, every record in the set can be identified by the ticker symbol. The other field is "shares", whose type is a (nested) set of pairs (temporal context, value). Like before, the temporal context is used to capture the time periods under which the "value" (i.e., number of shares) holds. Since value is the key attribute, this implies that at any point in time, every pair in the set can be uniquely identified by the value. However, this does not rule out the possibility that there can be multiple distinct values that occur at the same time point. The notation SetOf* is a uniqueness constraint which enforces that there can be at most one value at any time point. Although not shown, the schema can be extended to include definitions for "Education" and "Positions". Observe that "Positions" should be defined to permit Freddy to hold multiple positions at any time point (see right of FIG. 1) and the specification is similar to stocksHeld, where Freddy can hold multiple stocks at any time point.

An example that represents the first two reports under SEC filings on the left of FIG. 1 is shown near the bottom of FIG. 2A. It is seen that under each stock, the value (i.e., number of shares held) is associated with a temporal context. For example, 396043 shares of OLP were held in the time period given by (asof:7/01-now, reported:7/01-now) and 13415 shares of OLP were held in the time period given by (asof:8/25-now, reported:8/26-now). There is no temporal context associated with the attribute ticker because it is the key and its temporal context is identical to its "parent" (i.e., the temporal context associated with the enclosing record). The temporal contexts associated with stocksHeld and stock records are ignored for now since they are irrelevant for the rest of this discussion.

As another example, the first entry of OLP shares under "Stocks held" is shown at the bottom of FIG. 2A, where there are two records in the temporal context associated with the value 396043.

The path/person/stocksHeld is a valid path in the instances in FIG. 2A. Since "ticker" is the key for the relation stock, /person/stocksHeld/stock[ticker="OLP"] is a path that uniquely identifies the record whose ticker symbol is "OLP".

In this example, the source and target schemas are identical. In fact, as described later, the time-aware union operator is a binary operator that takes two instances of the same schema and produces an instance also of the same schema. In general, a pre-processing step may be required to extract or transform data into the desired target format before time-aware union is applied.

The schemas that are permissible under this model in the absence of temporal contexts are similar to nested relational schemas which are widely used in data integration and data exchange (see the paper to L. Popa et al., "Translating Web Data," *VLDB*, pp. 598-609, 2002). It can thus model hierarchical data in its full generality, with a relational model as a special case. This model also captures non first-normal form temporal models (see Chapter 14 in the book by J.

Chomicki et al., *Temporal databases*, Foundations of Artificial Intelligence, Elsevier, 2005) also known as temporally grouped models (see the papers to J. Clifford et al., "The historical relational data model (hrdm) revisited," *Temporal Databases*, pp. 6-27, 1993 and "On completeness of historical relational query languages," *ACM TODS*, 19(1): 64-116, 1994) as special cases. For the rest of the discussion, the underlying data model is exposed in the discussion of the present invention's algorithms but otherwise, the more intuitive illustrations shown in FIG. 1 and FIG. 2B are used in these discussions.

Adjustment Policy:

As mentioned earlier, different values may occur at the same point in time and this may be considered as a conflict under the constraints specified by the schema. For example, Freddy Gold can hold only one quantity of shares of a particular stock at any point in time (but could hold multiple job titles). An adjustment policy defines how conflicts are to be resolved according to the semantics of the application. Intuitively, a conflict occurs when a database at a particular time point contains two or more distinct values that violate a given uniqueness constraint. For example, there would be a conflict if the last instance of FIG. 2A contains another Pair under the field "shares":

Pair[C:{Rcd[asof:(8/25-now), reported:(8/26-now)]}, value: 13415]

Two distinct values (390643 and 13415) can now occur simultaneously at the time point (asof:8/26,reported:8/30) and this violates the uniqueness SetOf* constraint specified in the schema.

FIG. 2B illustrates three examples of different policies that can be used to resolve conflicting information about the number of shares held, and the result of merging the SEC filings of FIG. 1 according to each of those policies. Intuitively, the first policy resolves a conflict by favoring filings with a later asof time, and truncating the asof time of the filing with an earlier asof time to remove any overlap with the favored filing. For example, note that the pair above for 13415 shares of OLP overlaps with and has an earlier asof time than the (asof=8/26-now, reported=8/30-now) temporal context record for 396043 shares of OLP in the last instance of FIG. 2A. As shown in the top left of FIG. 2B, to integrate the pair, the asof time for 13415 shares would be truncated to 8/25-8/26 to remove the conflict. As another example, the two remaining filings for OLP on the 3rd and 4th rows of FIG. 1 conflict with each other. As shown in the top left of FIG. 2B, the conflict between the 4th row (1322179 shares of OLP as of 8/20 reported on 8/30) and the 3rd row (141 shares as of 8/23 reported on 8/24) can be resolved under this policy by truncating the 4th row to have an asof time from 8/20-8/23. The top of FIG. 2B shows the final result of integrating all 7 filings for OLP and BRT under this policy.

The second policy resolves a conflict by favoring evidence with a later reported time, and again truncating the asof time of the report with an earlier reported time to remove any overlap with the favored filing. Thus, the conflict between the 8/30 report with 1322179 shares of OLP as of 8/20 and the 8/24 report with 141 shares as of 8/23 (4th and 3rd row of SEC filings on the left of FIG. 1) would instead be resolved under this policy by rejecting the 8/23 report (because truncating the asof time from 8/23-now not to overlap with 8/20-now results in a null asof time). Similarly, the conflict between the 8/22 report with 1820 shares of BRT as of 7/09 and the 8/02 report with 0 shares of BRT as of 7/14 would be resolved under this policy by rejecting the 8/02 report (again, because truncating the asof time of 7/14-now not to overlap with 7/09-now results in a null asof time).

A visual inspection of these data yields a third possible policy. A reasonable interpretation of the OLP filings in FIG. 1 is that the reports filed on 8/24 and 8/26 were erroneous, and the later reports filed on 8/30 are intended to correct the errors. On the other hand, an equally reasonable interpretation of the BRT filings is that Freddy Gold held 1820 shares of BRT from at least 7/09 until 7/14, at which point he sold all of his shares. However, the report of the sale was filed earlier than the report that indicated he had 1820 shares on 7/09. Policy 1 or policy 2 by themselves cannot accurately capture both of these interpretations. However, suppose that the 8/30 filings on OLP were explicitly marked as corrections (perhaps indicated by the 'C' in FIG. 1). Then, as shown FIG. 2B, a third adjustment policy that first favors filings marked as corrections, and in the absence of corrections, favors the filing with the later asof time, would produce both of these interpretations.

Which of these policies is correct depends on the semantics of the application. These discussions point out the need to provide an extensible framework that goes beyond taking a simple union of facts of different sources for integration. The present invention provides a special union operator, called time-aware union, which can be used to merge time-aware facts together according to constraints imposed by the schema, where adjustments to time are made according to user-specified adjustment policies. An important item to note, however, is that the time-aware union must be idempotent, commutative and associative, so that regardless of the order in which the conflicting reports are inspected, the integrated outcome is the same. The time-aware union algorithm is described next.

Time-Aware Union

Time-aware union is a binary operator that merges different instances of a Chronicle schema S into a single instance that conforms to S according to the constraints of S and the associated adjustment policy. Note that it is assumed that source instances, which may originally exist under different schemas, are already translated into instances that conform to S.

In what follows, the present invention's algorithm (see FIG. 8A through 8C) is explored by focusing on two dimensions of time (asof and reported) and a fixed adjustment policy that integrates time-specific data by favoring evidence with a more recent 'asof' date (i.e., policy 1 in FIG. 2B). However, it should be noted that the present invention's algorithm can be easily extended to multiple time dimensions and where different adjustment policies can be "plugged-in" as long as the adjustment function satisfies certain algebraic properties.

The Time-Aware Union Operator

The time-aware union algorithm is described in Algorithm 1 shown in FIG. 8A. It makes use of a fuse function (Algorithm 2, shown in FIG. 8B), which in turn depends on the adjust function (Algorithm 3, shown in FIG. 8C). The adjust function captures the adjustment policy used to resolve conflicts in data values over time that arise from constraints in the present schema. At a high-level, the time-aware union takes as input a schema S defined under the current data model and two instances $T_1$ and $T_2$ that conform to S. The result of $T_1 \uplus T_2$ is an instance that also conforms to S such that: (a) every path in $T_1$ or $T_2$ can be found in $T_1 \uplus T_2$, (b) every path in $T_1 \uplus T_2$ can be found in $T_1$ or $T_2$, and (c) the temporal context associated with an element in any path in $T_1 \uplus T_2$ is the result of adjusting the temporal contexts of the corresponding elements in $T_1$ and/or $T_2$ under the same path according to the specified policy.

In other words, $T_1 \uplus T_2$ provides an integrated view of $T_1$ and $T_2$ by fusing identical elements in $T_1$ and/or $T_2$ together and providing an interpretation of their corresponding temporal contexts according to the adjustment policy at hand.

The time-aware union algorithm proceeds according to the nested structure of $T_1$ and $T_2$ and it is divided into four cases, corresponding to the types of $T_1$ and $T_2$. Observe that $T_1$ and $T_2$ must have the same type, since they conform to the same schema S. Otherwise, an error is immediately returned (see line 23, Algorithm 1).

If $T_1$ and $T_2$ are both Pair types or both SetOf* Pair types, then fuse($T_1$,$T_2$) is immediately invoked (see lines 13-14 and 21-22).

If $T_1$ and $T_2$ are both SetOf Pair types (see lines 3-12), then, by the requirements of a Chronicle schema, the elements in each set must be identifiable through keys. $T_1$ is returned if $T_2$ is empty (and vice versa). This is captured in lines 4-5 of Algorithm 1. Otherwise, elements of $T_1$ and $T_2$ are merged with the same key through a recursive call to time-aware union (lines 10-11) and then the result of the call is returned together with elements that are exclusively in $T_1$ and elements that are exclusively in $T_2$ (see line 12).

A similar situation happens when $T_1$ and $T_2$ are both record types. Recall that $T_1$ and $T_2$ are both instances of S and hence, they must have the same record type R. Lines 16-17 of the algorithm account for the cases where the records may contain only a subset of the fields of R. The flexibility in omitting fields is useful as a data source may only contain a subset of known fields in general. Time-aware union is recursively invoked for each field that occurs in both $T_1$ and $T_2$ (see line 20, fields 1 to k). Otherwise, the "subtree" is simply returned (see fields k+1 to m and k+1 to n).

Observe that only identical elements (either due to identical key values or due to identical fields of records) are recursively unioned. The fuse algorithm, which is invoked in lines 14 and 22 of Algorithm 1 is detailed in Algorithm 2, which is explained next.

Fuse and Adjust

The fuse algorithm takes two Pairs or SetOf* Pairs as input. When both inputs are Pair types, the temporal contexts are first adjusted according to Algorithm 3, which is invoked through line 5 of Algorithm 2. Recall that a temporal context is a set of records, where each record contains two fields (asof and reported), and each field is a time interval consisting of a starting time and ending time. The records of the temporal contexts of $T_1$ and $T_2$ are pairwise adjusted in lines 4-9 of Algorithm 3 and the result is a pair of temporal contexts which is returned to line 5 of Algorithm 2 as $(c'_1, c'_2)$. After this, if $v_1$ and $v_2$ are non-atomic types, a recursive call to $v_1 \uplus v_2$ is made in line 10. Otherwise, if $v_1$ and $v_2$ are equal atomic values then, a pair is returned as shown in line 8. Note that the case where $v_1$ and $v_2$ are atomic types of unequal values can never occur. Recall that if a Pair associates a temporal context with an atomic type, then it must be enclosed by a SetOf (or SetOf*) type by the requirements of the current model. This means that line 22 of Algorithm 1 is invoked only under the context of line 11 of the same algorithm, on identical atomic values.

On the other hand, if both inputs are SetOf* Pair types, then the temporal contexts of pairwise elements from both sets are adjusted (lines 11-18 of Algorithm 2). At the end, all elements from both sets are returned, where elements from both sets with the same key are fused together.

For each pair of records picked by lines 4 and 5 of Algorithm 3, the time periods are adjusted according to lines 10-37 of Algorithm 3. As mentioned earlier, adjustment policies may depend on the semantics of the application; this part of the algorithm has been written based on an adjustment policy that prefers information given by a later asof time (i.e., policy 1 in FIG. 2B). If the starting asof times (denoted by $l_1$ and $l'_1$) are equal and the starting reported times (denoted by $l_2$ and $l'_2$) are equal (see lines 16-17), then a fixed policy of rejecting either the first or second record based on additional metadata is followed, such as the source of each record, or, based on data, such as by key value. Otherwise (see lines 19-23), if $l_2 < l'_2$ (i.e., $e_1$ has an earlier reported time), then $e_2$ is rejected. In other words, if the asof times are identical, then information with an earlier reported time is preferred.

In the event that $l_1 < l'_1$ (i.e., $e_2$ has a later asof time and is hence preferred), then the time interval of $e_1$ is adjusted if $r_1 > l'_1$ (i.e., the ending asof time of $e_1$ is greater than the start asof time of $e_2$). If this is the case, then $e_1$'s asof interval down to $(l_1, l'_1)$ is trimmed. Otherwise, $e_1$ is left unchanged.

Note that the adjust function assumes that the time records within each temporal context are non-overlapping (i.e., the time records do not share any time point). It is easy to see that as long as input instances satisfy this assumption, this assumption will continue to hold for the result of time-aware union since time records can only "shrink" after adjustments through Algorithm 3. In addition, temporal contexts are unioned together only if they are non-overlapping (lines 8 and 10 of Algorithm 2).

Example

Figure 3:
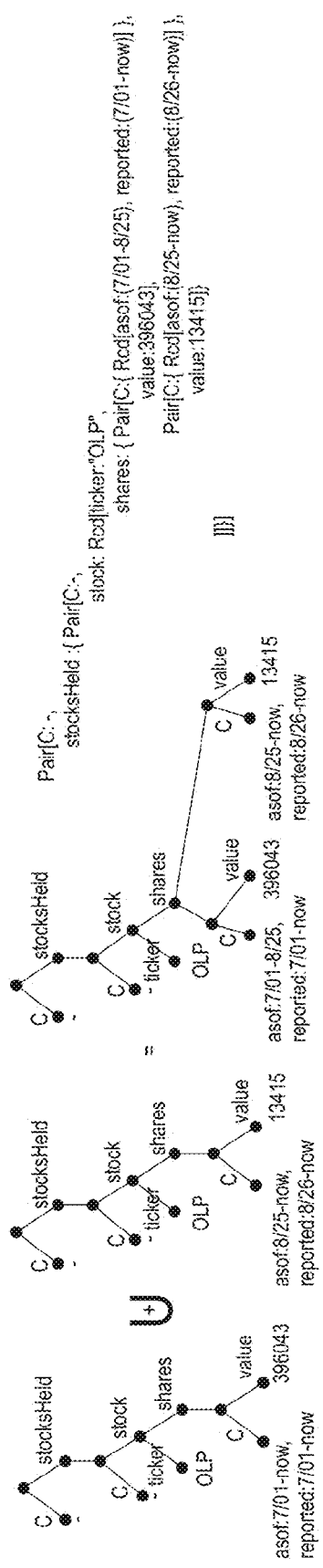
FIG. 3 illustrates two instances of SEC filings shown in FIG. 2A and the result and time-aware union applied to the two instances.

Let $T_1$ and $T_2$ denote the two SEC filings shown in FIG. 2A, which are also illustrated on the left of FIG. 3. The result of $T_1 \uplus T_2$ and its corresponding syntax are shown on the right of FIG. 3. Observe that the element "shares" in $T_1$ and $T_2$ each has a single child. In $T_1 \uplus T_2$, the "shares" element now has two children, corresponding to two Pairs types, each with its own temporal context that describes the time periods which the respective values (i.e., 396043 and 13415) are valid. The asof time interval that is associated with the value 396043 has been adjusted through line 32 of Algorithm 3 to reflect the understanding that there the number of shares held by Freddy is unique at any given point of asof time.

Concretely, the root elements of $T_1$ and $T_2$ are Pair types and hence, fuse will be invoked on line 22 of Algorithm 2. This will cause the associated temporal contexts to be adjusted (not shown in FIG. 3). Line 10 of Algorithm 2 will recursively invoke Algorithm 1 on the corresponding stocksHeld elements of $T_1$ and $T_2$. Since the value of stocksHeld is a SetOf Pair type according to the schema, line 3 of Algorithm 1 will be executed. For this example, since there is only a single Pair with the same key (i.e., ticker:"OLP") in each of the corresponding sets, line 11 of Algorithm 1 will be invoked and the temporal contexts of these two pairs will be adjusted by line 5 of Algorithm 2.

Like before, line 10 of Algorithm 1 will recursively invoke Algorithm 1 on the corresponding shares element of $T_1$ and $T_2$. This time, however, "shares" has a SetOf* Pair type. Concretely, let $p_1$=Pair[C:$c_1$, value:396043] denote the element in the first set and let $p_2$=Pair[C:$c_2$, value:13415] denote the element in the second set, where $c_1$={Rcd[asof: 7/01-now, reported:7/01-now]} and $c_2$={Rcd[asof:8/25-now, reported:8/26-now]}. Line 13 of Algorithm 1 will be invoked on {$p_1$} and {$p_2$}. The call to adjust on $c_1$ and $c_2$ through line 16 of Algorithm 2 will lead us to the scenario that $l_1 < l'_1$ and $r_1 > l'_1$, where $l_1 = 7/01$, $l'_1 = 8/25$, and $r_1 = $ now. As a result, the temporal context associated with 396043 becomes (asof:(7/01,8/25), rep:(7/01,now)). The result is now one integrated instance, which consolidates the knowledge given by $T_1$ and $T_2$.

Figure 4:
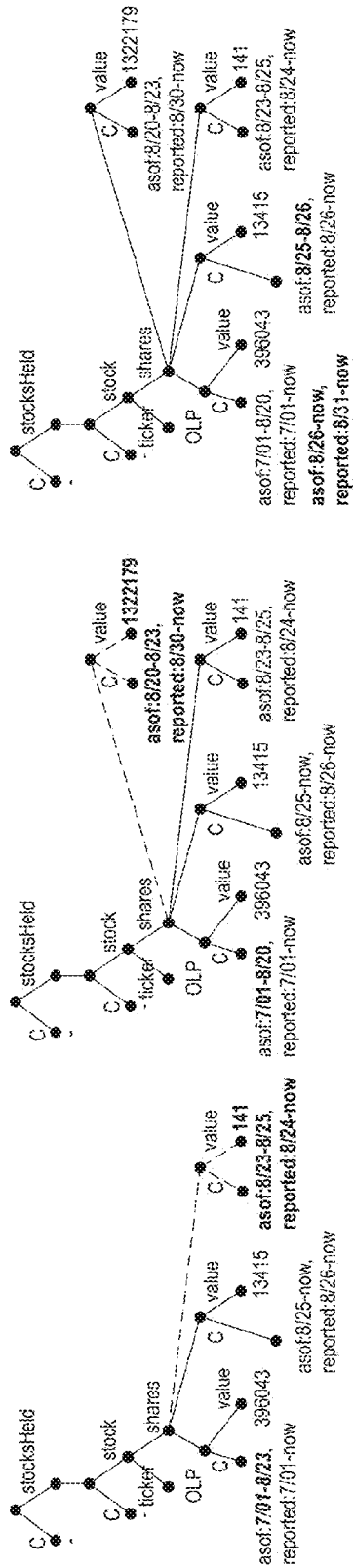
FIG. 4 illustrates the sequence of intermediate results from FIG. 3.

FIG. 4 shows the sequence of intermediate results obtained as a consequence of integrating the 3rd, 4th, and 5th SEC filings, in this order, from FIG. 1 into the result of $T_1 \uplus T_2$ (shown on the right of FIG. 3). In each intermediate result, the dashed edges show the new additions and the bold words show the differences from the result prior to the integration. For example, the leftmost figure in FIG. 4 shows the effect of integrating information about the 141 OLP shares with $T_1 \uplus T_2$. The three dashed edges illustrate the addition of a Pair type, which consists of a temporal context and an atomic value (i.e., 141) into the set of shares. The bold dates show the adjustments that are made to the time periods so that the key constraints are satisfied. Similarly, the middle of FIG. 4 shows the result of integrating information about 1322179 OLP shares into the leftmost figure. For the rightmost figure, no new edges are created. Instead, the integration of the information about 396043 shares caused a new record to be inserted into the temporal context associated with the value 396043. This final integrated archive illustrates the overall combined understanding of OLP shares given by all the available SEC reports. It also corresponds to the illustration shown under Policy 1 in FIG. 2B.

Algebraic Identities of Time-Aware Union

In this section, several desirable properties of the present invention's time-aware union operator are described. In particular, it is shown that the present invention's implementation of time-aware union, based on the current adjustment policy, is well-suited for data integration because it is idempotent, commutative, and associative. These properties ensure that an instance that is integrated with itself is still equivalent to the original. Furthermore, regardless of the order that instances are integrated, equivalent final results (modulo representation of time) are obtained. Towards these results, a definition of when two instances are equivalent is given first.

Definition: Let $T_1$ and $T_2$ be two instances that conform to the same schema. $T_1$ is equivalent to $T_2$, denoted as $T_1 \equiv T_2$, if the following holds:
- if $T_1$ and $T_2$ are atomic types, then $T_1 = T_2$ must hold true.
- if $T_1$ and $T_2$ are records $Rcd[l_1:v_1, \ldots, l_k:v_k]$ and, respectively, $Rcd[l_1:v'_1, \ldots, l_k:v'_k]$, then $v_1 \equiv v'_1, \ldots, v'_k$ must hold true.
- if $T_1$ and $T_2$ are $Pair[C:c_1,l:v_1]$ and, respectively, $Pair[C:c_2,l:v_2]$, then the set of time points given by $c_1$ is identical to the set of time points given by $c_2$ and $v_1 \equiv v_2$.
- if $T_1$ and $T_2$ are SetOf Pair (or SetOf* Pair) types, then for all $e \in T_1$, there exists $e' \in T_2$ such that $e$ and $e'$ have the same key value and $e \equiv e'$. In addition, the converse also holds.

Proposition: (Idempotence of $\uplus$) Let T be an instance of a schema, then $T \uplus T = T$.

PROOF: It is straightforward to verify that because the inputs to $\uplus$ are identical, this amounts to showing that fuse(T,T) returns T. Indeed, if T is a Pair type, then adjust (c,c) returns $(c'_1,c'_2)$ such that the set of time points in $c'_1 \cup c'_2$ is identical to c. This is because the time records within a temporal context do not overlap (i.e., they do not contain any time point in common). Hence, whenever adjust is invoked in line 5 of Algorithm 3, either $(e_1,e_2)$ is returned unmodified (line 16) or $(e_1,\emptyset)$ (or $(\emptyset,e_2)$) is returned (line 20).

If T is a SetOf* Pair type (see lines 11-22 of Algorithm 2), then it must be that for any pair $p_1 \in T$ and $p_2 \in T$, they are either identical or different pairs in T. Recall that under SetOf*, distinct pairs of T must have non-overlapping temporal contexts. If the pairs are identical, then adjust(c,c) will be invoked in line 16 of Algorithm 2, where c is the identical temporal context of the pair. The result $(c'_1,c'_2)$ that is returned by adjust is such that $c'_1 \cup c'_2$ contains the same set of time points as c. Furthermore, since $v_1$ and $v_2$ must have the same key in this case, they will be fused together in line 21 of Algorithm 2, where the temporal context associated with the result of $v_1 \uplus v_2$ is $c'_1 \cup c'_2$. If the $p_1$ and $p_2$ are distinct pairs in T, then their temporal contexts $c_1$ and, resp., $c_2$ are nonoverlapping, and hence, $(c_1,c_2)$ will be returned unmodified. Thus, $T \uplus T \equiv T$.

Theorem: (Commutativity of $\uplus$) Let $T_1$ and $T_2$ be two instances that conform to the same schema. Then, $T_1 \uplus T_2 \equiv T_2 \uplus T_1$.

PROOF: To show that $\uplus$ is commutative, it needs to be shown that $fuse(T_1,T_2) \equiv fuse(T_2,T_1)$. In turn, this amounts to showing that the adjust function is "commutative". In other words, let $(c'_1,c'_2)$ be the result of $adjust(c_1,c_2)$, where $c_1$ and $c_2$ are two temporal contexts and let $(c''_1, c''_2)$ be the result of $adjust(c_2,c_1)$. Then, the set of time points given by $c'_1$ (resp. $c'_2$) is identical to the set of time points given by $c''_1$ (resp. $c''_2$). The proof hinges on the observation that the adjust function compares only start asof and reported times of time records, which are never modified during the adjustment process. In line 30 of Algorithm 3, however, the algorithm compares the end asof time (which may be modified to a smaller value during the process) of one record to the start asof time of the other. The final value assigned as the end asof time is independent of the order it is compared to records from the other temporal context; for every $Rcd[asof:(l_1,r_1), reported:(l_2,r_2)]$ in $c_1$, its end asof time will be the smallest start asof time $l'_1$, among all time records in $c_2$, for which $l_1 < l'_1$ and $r_1 > l'_1$.

Theorem: (Associativity of $\uplus$) Let $T_1$, $T_2$, and $T_3$ be instances that conform to the same schema. Then, the following holds: $(T_1 \uplus T_2) \uplus T_3 \equiv T_1 \uplus (T_2 \uplus T_3)$.

PROOF: It is shown that $\uplus$ is associative by induction on the structure of the schema. The proof makes use of the "associative" property of adjust. It also hinges on the property that arbitrary choices of pairwise adjustments of the temporal contexts in lines 11-18 of Algorithm 2 do not affect the final outcome. Furthermore, an adjustment of a temporal context c' against another temporal context c' is invariant to prior adjustments that may have occurred to the temporal context c'.

DISCUSSION

The present invention's implementation of the time-aware union operator does a depth-first traversal of the input instances to be merged, processing each input instance in a single pass, followed by a write of the merged content back to disk. Some remarks are in order now on several fine points in present invention's implementation.

Inheritance and Containment:

An important property that is implicit in the present invention's model is that the temporal context of a child node $c_1$ is always contained within the temporal context of its parent $c_2$. This means that every time point in $c_2$ must also be a time point in $c_1$ and is similar to the idea of inheritance of timestamps (see the paper to P. Buneman et al., "Archiving scientific data," *ACM TODS, V*29, pp. 2-42, 2004). With the containment property, a temporal context need not be present at every node and it can be inherited. The root node, however, is always associated with a temporal context. If a non-root node does not have a temporal context, then it inherits the existing temporal context of its nearest ancestor. This results in substantial storage savings for nodes that undergo change infrequently (also observed in the paper to P. Buneman et al., "Archiving scientific data," *ACM TODS*, V29, pp. 2-42, 2004 for the case of single-dimensional timestamps). Perhaps more importantly, this storage scheme can potentially generate savings in execution time during time-aware union; if child nodes with identical keys in the input instances do not have their own temporal context, but instead inherit their parent's context, then fuse( ) need not be invoked for the child nodes.

In the present invention's implementation, it is possible that as a result of a union, a parent node's temporal context is updated in such a way that a child's temporal context is no longer contained within the parent context. For example, if new information arrived to indicate that Freddy Gold did not hold any executive positions until 1985, then the fact that he was the chair of OLP from 1984-now must be truncated to 1985-now in the right picture of FIG. 1. In this case, to preserve the containment property, the child context must be truncated to fit into the parent's context. The present invention's implementation maintains the containment property lazily. That is, the temporal context is stored "as-is" and may violate the containment property in general. When a retrieval request is posed against the instance, the subtree that matches the request is computed in a top-down, depth-first traversal of the instance. As a child node of the subtree is visited, if it has a temporal context, then its context is truncated to be contained in the nearest ancestor's temporal context.

Properties of Temporal Context:

It has been shown that coalescing adjacent time periods, while providing an equivalent and more compact representation of time, can affect the results of queries over those time periods (see the paper to M. H. Bohlen et al., "Coalescing in temporal databases," In T. M. Vijayaraman et al. eds, *VLDB*, pp. 180-191, Morgan Kaufmann, 1996). This is true of the time records of temporal contexts as well. For example, consider the temporal context associated with 396043 shares of OLP. In FIG. 1, two separate filings indicate Freddy Gold had 396043 shares of OLP on 7/01 and again on 8/26 (as shown by the first and fifth row in FIG. 1). Suppose these two filings were merged together before any of the other filings. In this case, if these time intervals were coalesced, the temporal context for 396043 shares of OLP would be recorded as (asof=7/1-now, reported=7/1-now). Now suppose that the fourth filing with an asof time of 8/20 and reported time of 8/30 is merged. By the adjustment policy, the time associated with 396043 shares of OLP would be adjusted to (asof=7/1-8/20,reported=7/1-now). Furthermore, the time associated with 1322179 shares would be (asof=8/20-now, reported=8/30-now), which results in a loss of information that Freddy once again had 396043 shares of OLP on 8/26. If, instead, the time periods associated with the first and fifth filing were not coalesced, but adjusted relative to each other using the adjustment policy, then the temporal context for 396043 shares of OLP would be (asof=7/1-8/26, reported=7/1-now), (asof=8/26-now, reported=8/26-now). When this result is unioned with the fourth filing and their temporal contexts are fused, the temporal context associated with 396043 shares of OLP becomes (7/1-8/20, 7/1-now), (8/26-now, 8/26-now), which, as shown on the right of FIG. 1, accurately records the change in the number of shares registered on 8/26. Thus, to maintain the correctness of time-aware union, time periods are stored uncoalesced, and can be coalesced as required (for example, to check containment of a child node's temporal context within a parent node's temporal context).

Properties of Adjustment Policies:

As mentioned previously, the appropriate policy by which to adjust conflicting time periods may depend on the semantics of the application. Three possible policies have been illustrated based on different interpretations of the SEC filings. The present invention's time-aware union operator allows for different policies to be "plugged-in". It can also be shown that the idempotent, commutativity, and associativity properties for time-aware union hold as long as the adjustment function satisfies essentially similar properties.

Experience with Real Data

In one non-limiting example, the time-aware union algorithm was implemented in Java 6 running on a Xeon Intel 3.4 GHz dual core Linux workstation with hyper-threading enabled and 4 GB RAM. The present invention's implementation was built on top of the source code of XArch (see the paper to H. Muller et al., "Xarch: archiving scientific and reference data," *ACM SIGMOD*, pp. 1295-1298, 2008), and leverages their key specification to specify the constraints for the Chronicle data model. Several data sets were experimented with to analyze the algorithm with respect to compactness and scalability.

SWISS-PROT

The SWISS-PROT (see the web site for E.B. Institute, Swiss-Prot Protein Knowledgebase) provides a data set via their large, regularly updated, hierarchical database of protein sequences (see the paper to I. Koltsidas et al., "Sorting hierarchical data in external memory for archiving," *PVLDB*, 1(1): 1205-1216, 2008). Each SWISS-PROT release, or version, includes both new elements and updates to existing elements. 10 releases of SWISS-PROT were obtained. Release 40 has over 17 million elements and its file size is 403 MB, while release 49 has over 51 million elements with a file size of 1225 MB. The root node of each release was annotated with an asof time defined by the version release date and reported time given by the date of a press release announcing the availability of the version. In some cases, no press release could be found, and so a reasonable date was chosen for the reported time.

Gene Ontology

The Gene Ontology database (see the web site for Gene Ontology Database) is a medium size data set that contains a hierarchical description of gene characteristics for multiple species specified in RDF-XML format. The database is updated daily, and monthly extracts of the ontology going back to 2002 are available via ftp from the Gene Ontology Database. 20 release files were chosen, ranging in size from 27 MB to 53 MB. The root note of each file was annotated with an asof time defined by the first day of the month in which the file was released, and a reported time derived from the timestamp of the file.

SEC

The SEC requires that corporations regularly report information disclosing stock transactions of its officers and directors (see the SEC web site for the EDGAR Public Dissemination Service). Each report is relatively small, and includes the date the transaction occurred (asof time) and filed (reported time) with the SEC. Each file can also contain explicit time-specific information, such as the date, number and type of shares involved in a stock transaction, and the title of the insider on the day of the transaction. For current experiments, reports were arbitrarily extracted for the second half of 2010, which included over 20,000 separate filings for just over 9,000 entities.

For SWISS-PROT and Gene Ontology, key definitions for the Chronicle data model were obtained from XArch: The XML Archiver website, and for the SEC data, suitable key definitions were derived from the data itself. Both the SWISS-PROT and Gene Ontology data sets contain versioned data. Each file represents a complete version such that every keyed entity is mentioned only once, and the information for that entity is complete for that version. In contrast, the SEC filings represent snapshots of information about individual entities, and, as such, only contain partial information about an entity. For example, a filing may report that Freddy Gold has 396043 shares of OLP on 7/01/2010, but contains no information about the number of shares of BRT that he held that day.

Compactness

Figure 5A:
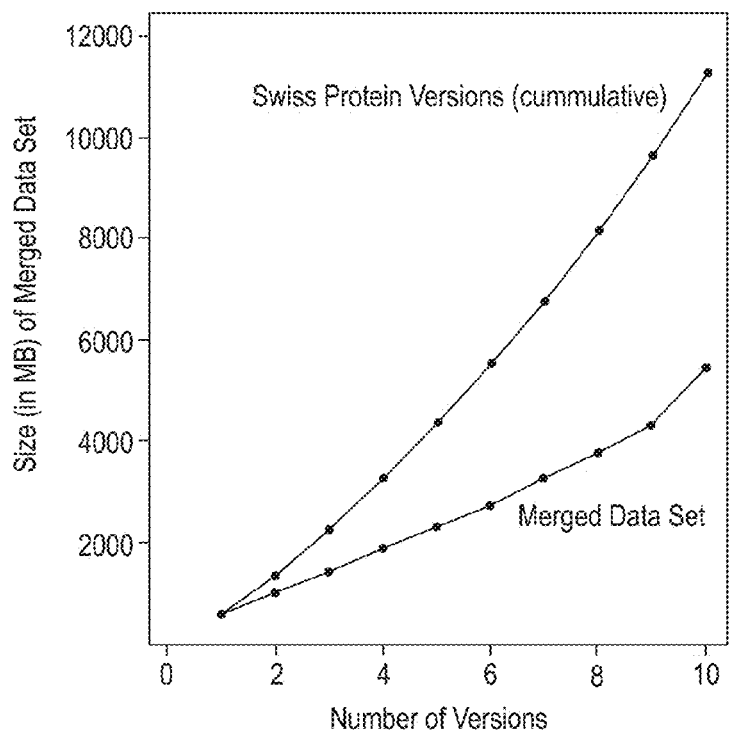
FIGS. 5A-C illustrate the size of merged versions of various data sets.
Figure 5B:
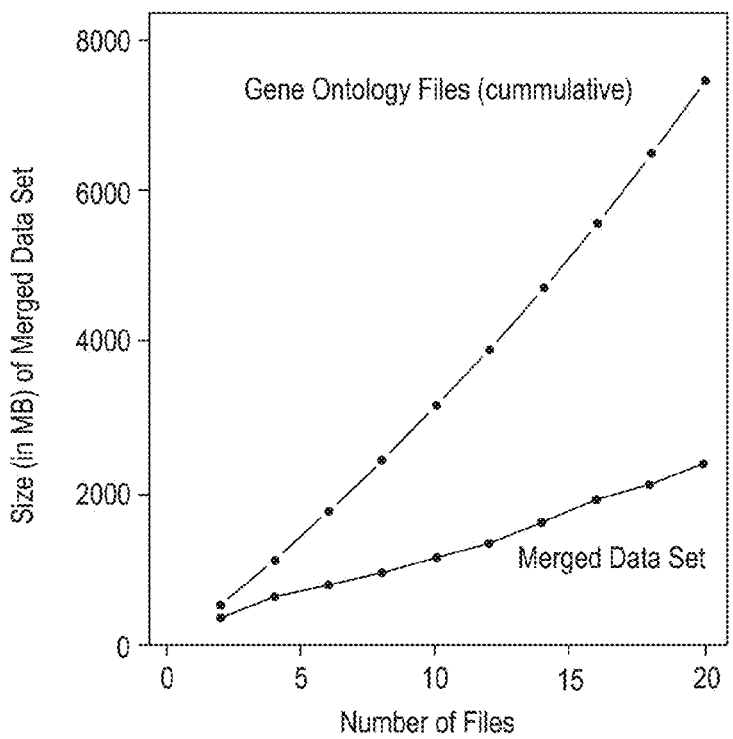

Temporal context is captured as additional annotations to store with the data. While the annotations can become quite lengthy for elements that undergo frequent changes, the storage required for these annotations is still quite small relative to the storage savings gained from the compact representation of the merged data, especially for large data sets. The graphs in FIGS. 5A-C justify this remark. For each of the three data sets, the graph shows the number of the files to be merged on the x-axis and the total size of the file, as produced by time-aware union on these files, on the y-axis. As shown, the changes in the consecutive sizes of the merged data set are substantially less than the cumulative size of each data set. For example, a merged file that contains all 10 releases of SWISS-PROT is less than 50% of the cumulative size of the releases themselves, and a merged file that contains all 20 versions of the Gene Ontology database is less than 30% of the cumulative size of the version files. One of the reasons for the savings in storage is because many of the elements in the SWISS-PROT and the Gene Ontology database are unchanged over each release, and hence, most of the temporal context remains unchanged over releases. Additionally, a change to an element value only adds the new value and modifies an annotation of the temporal context for previous values. These results are similar to those observed in the paper to P. Buneman et al., "Archiving scientific data," *ACM TODS*, V29, pp. 2-42, 2004.

Figure 5C:
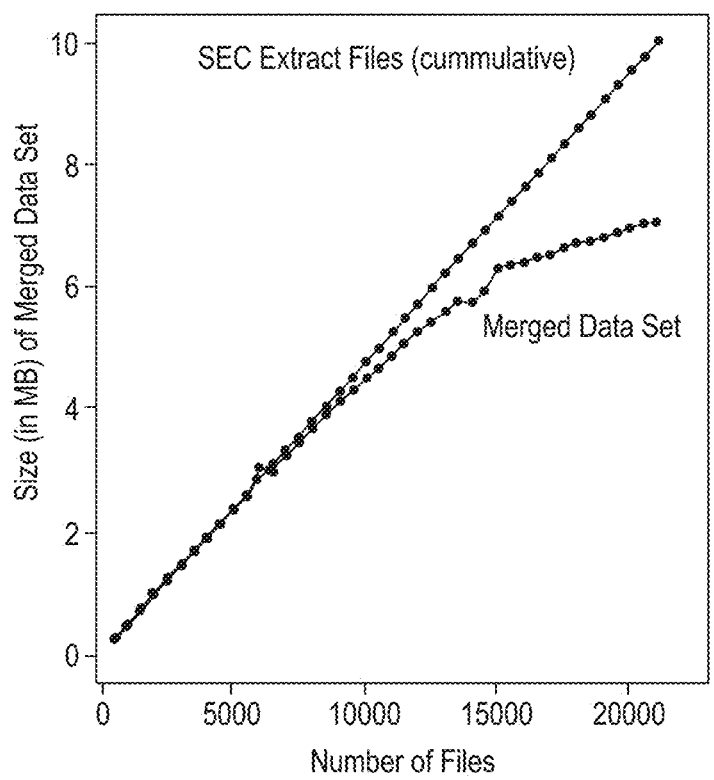

FIG. 5C illustrates a different storage pattern for the SEC data, with the merged data set size after 20,000 files to be about 30% less than the cumulative file size. This is because each filing is relatively small, and so the temporal context annotations make up a larger percentage of the data itself. Additionally, the number of distinct entities is large relative to the data set size. Indeed, the 20,000 filings shown here represent data collected on over 9,000 different entities. This is evident in the size of the merged data set relative to the file size for the first 10,000 entries, where the number of unique entries added to the merged data set is relatively high. As a result, the merged file size is roughly the same as the cumulative size of the individual files, and briefly, higher than the cumulative size of the files. As the number of files increases, the number of repeated entities is higher, and the result size starts to drop off relative to the original size of the files.

Figure 6A:
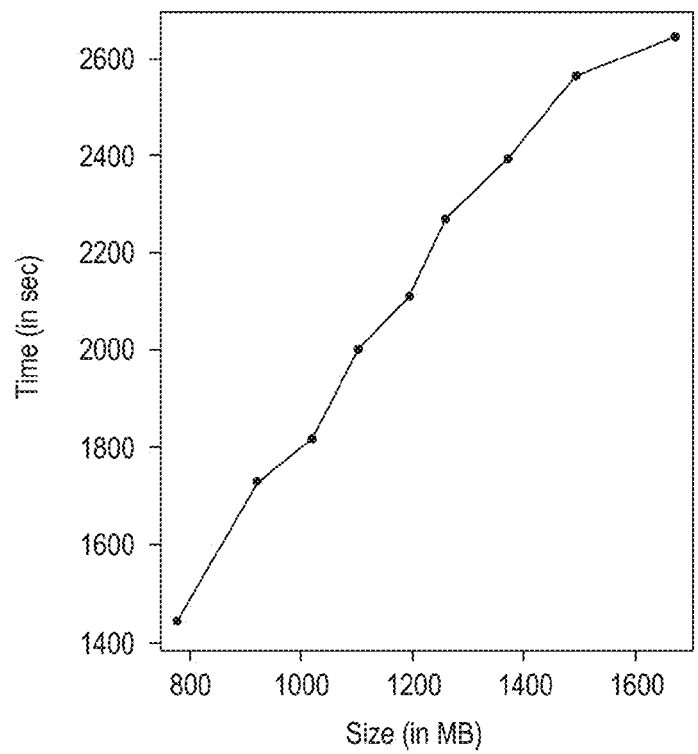
FIGS. 6A-B illustrate the time in seconds (y-axis) it takes to merge the SWISS-PROT and Gene Ontology data with respect to the file size in MB of each release (x-axis).
Figure 6B:
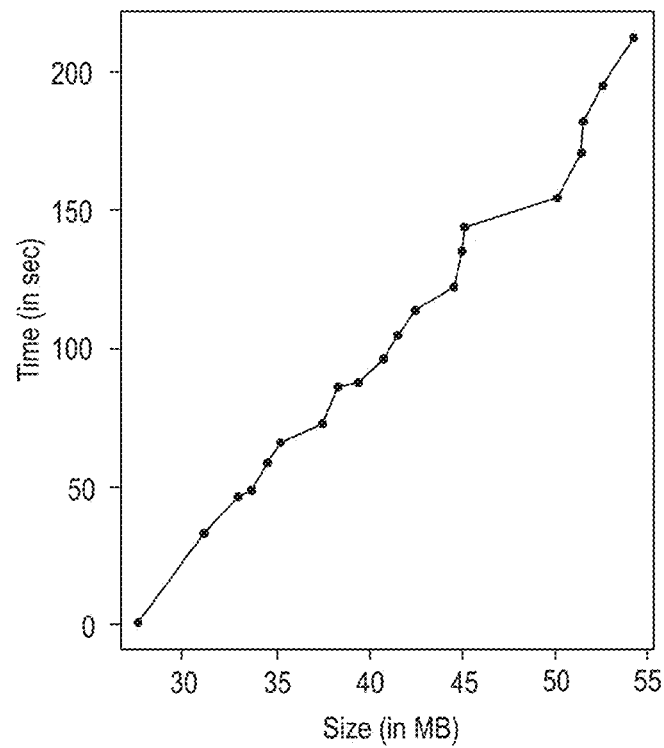

Scalability:

Time-aware union was applied to merge successive versions of the SWISS-PROT data, and successive versions of the Gene Ontology data. For both of these cases, the input to the merge algorithm is the data set containing the cumulative merged versions, and the new version. The graphs in FIG. 6A and FIG. 6B show the time in seconds (y-axis) it takes to merge the SWISS-PROT and Gene Ontology data with respect to the file size in MB of each release (x-axis). As shown, the execution time is roughly proportional to the size of the instances to be merged. This is because the algorithm reads both input instances once (in this case, the cumulative merged file and the new file to be merged), and writes their merged content back to disk. For a given incremental execution of the algorithm, let $m_1$ and $m_2$ represent the sizes of the two files to be merged. In the worst case, $m_1=m_2$, both files contain a distinct set of entities, and algorithm runs in m+m+2m, or O(m) time, where $m=m_1$ (or $m_2$).

Parallel Implementation of Time-Aware Union

Figure 6C:
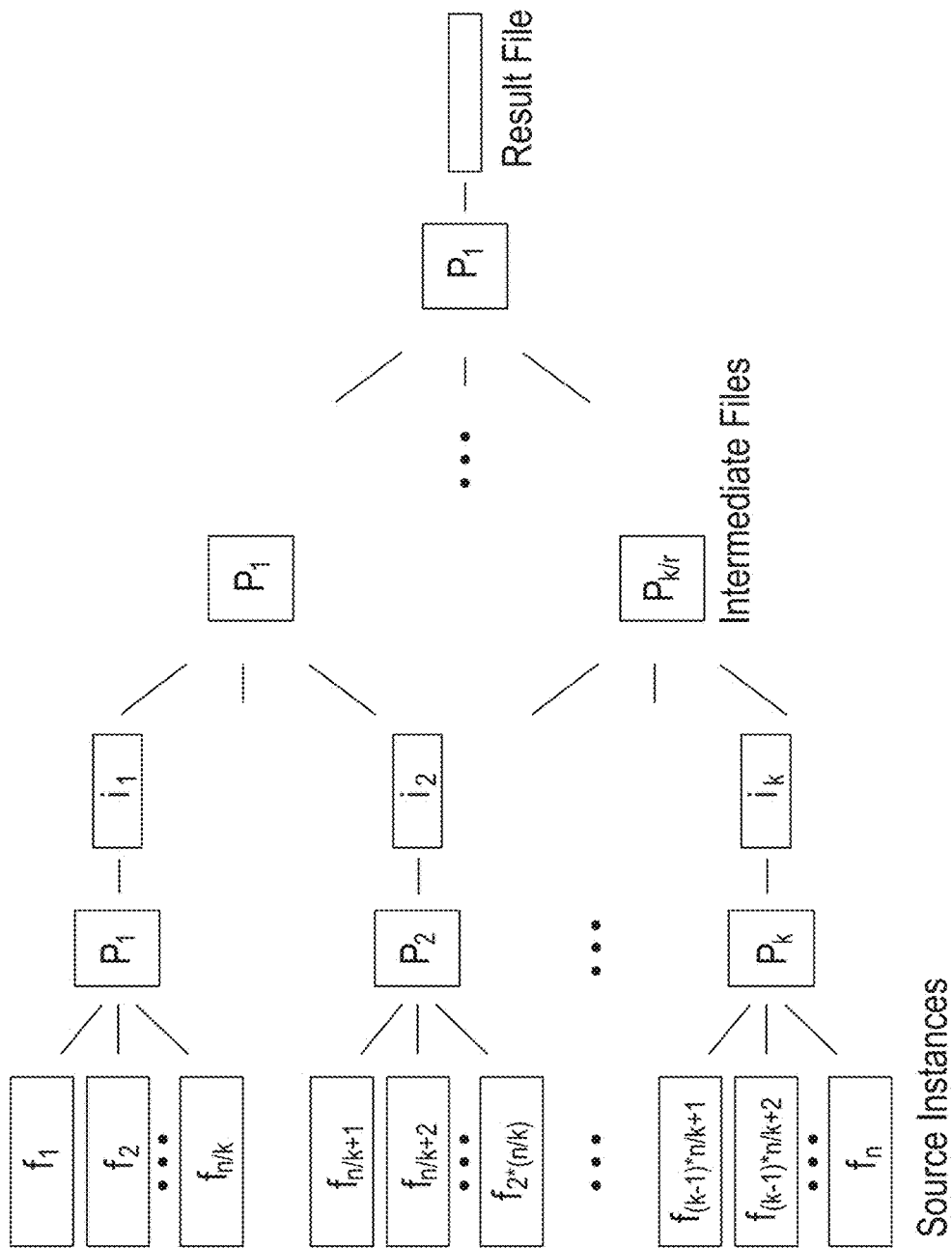
FIG. 6C illustrates an example of parallelizing time-aware unions.

The serial implementation of time-aware union can easily be applied to versioned data, since whole versions can be unioned in a single pass. The SEC data, however, are made up of over 20,000 instances. Therefore, a more efficient implementation of time-aware union is to build up a larger result by repeatedly unioning individual files in parallel. An important implication of the algebraic properties described previously is that it is possible to parallelize the algorithm and still guarantee an equivalent result (modulo representation of time). This implication was validated by implementing a simple parallel version of the time-aware union algorithm. As shown in FIG. 6C, files can be recursively merged in parallel to compute the final result. In the first iteration, k processes can perform time-aware union on n/k files each, producing k intermediate result files. It is assumed that n/k≥2 for time-aware union to apply (to ensure each process has at least 2 files over which to apply the time-aware union). Given a reduction factor of r, those k intermediate files can be merged by k/r processes to produce k/r files, and so on. Thus, given n input files, k processes, and a reduction factor r, the number of iterations needed to merge the files is $\log_r k+1$. Again, in the worst case in which all files are the same size and contain distinct entities, then, in iteration i, where i>1, each process merges $k/r^i$ files of size $(n/k)r^{i-1}m$.

Figure 7A:
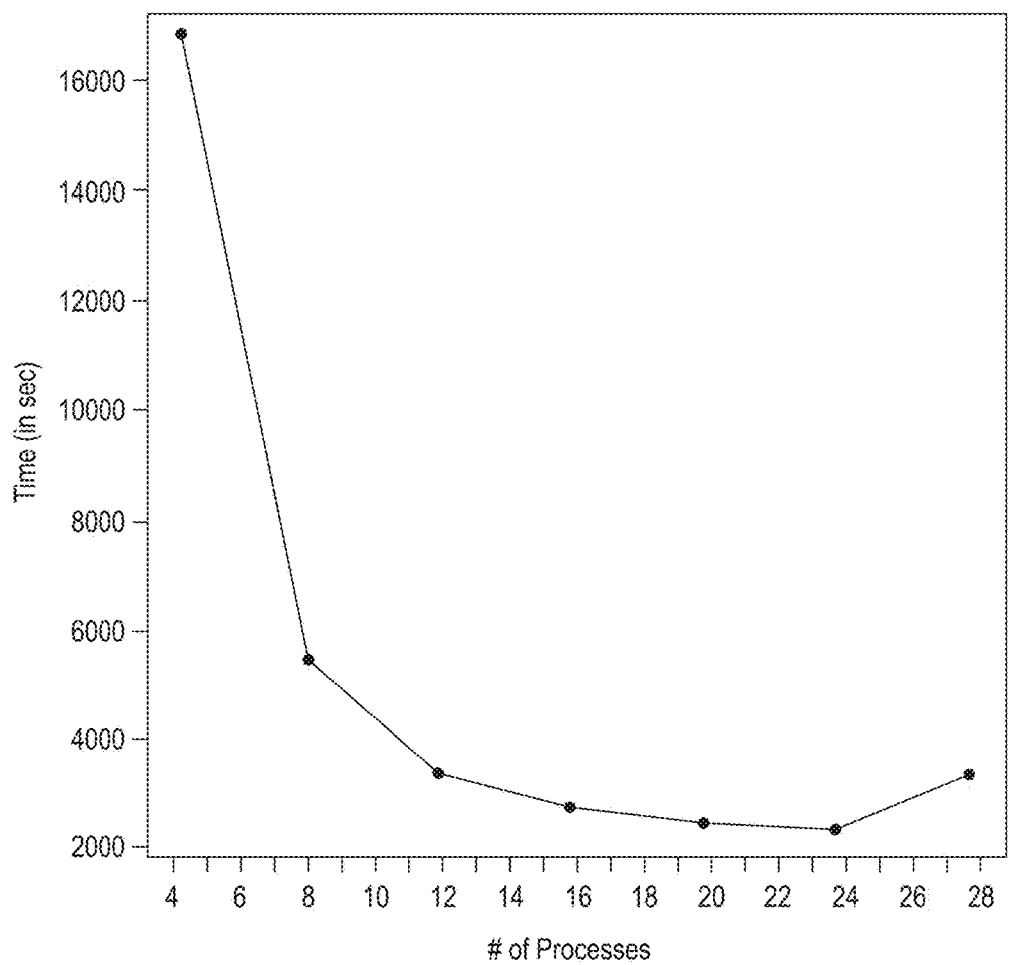
FIG. 7A illustrates an example graph of the time taken to merge data in parallel.
Figure 7B:
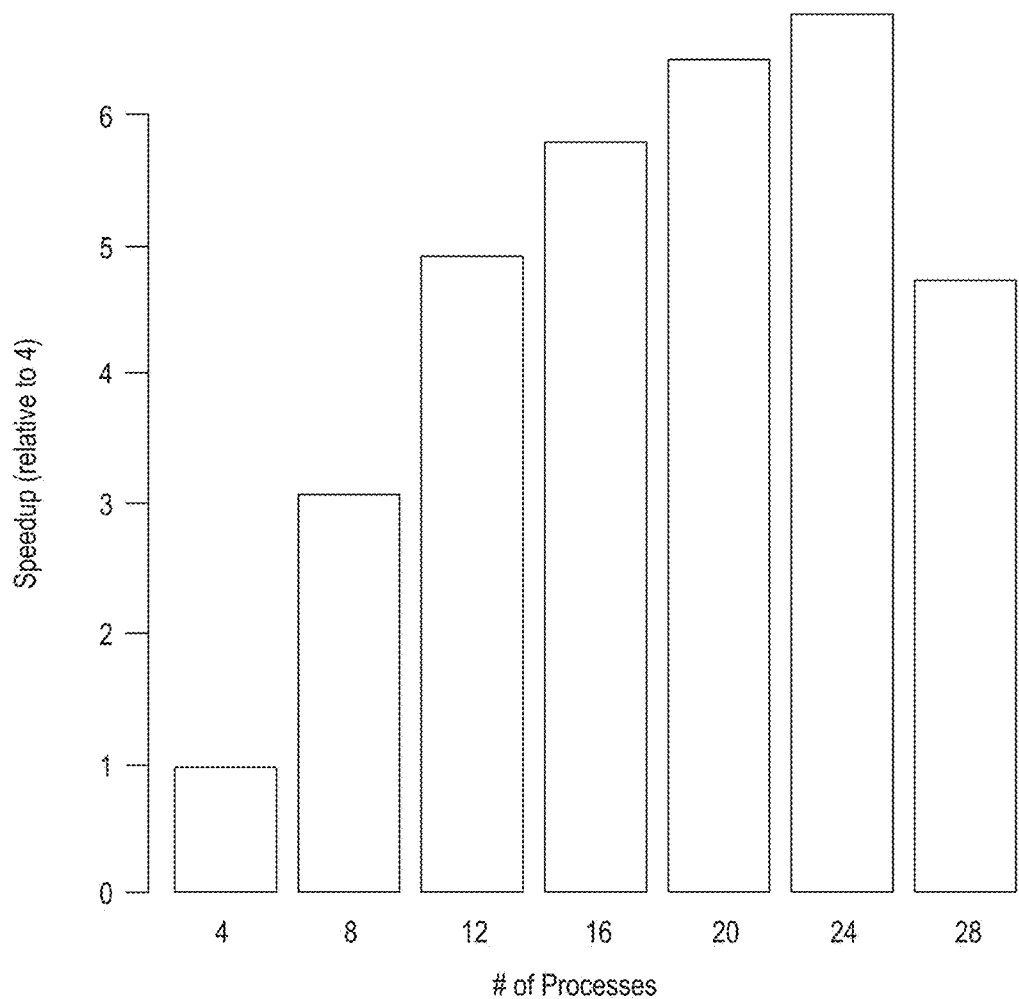
FIG. 7B illustrates the speedup of the merge process.

The parallel version of time-aware union was tested on the SEC data with a reduction factor r=2, and the results are shown in FIG. 7A and FIG. 7B. The first graph shows the time in seconds to merge the SEC data using 4, 8, 12, 16, 20 and 28 processes, and the second graph shows the speedup (relative to 4 processes) as the number of processes is increased. The graphs show consistent speedup and resource utilization of the test machine, with the largest speedup occurring with 24 processes. The run with 28 processes exhibited both a decrease in speedup and increase in execution time, indicating that resource utilization of the test machine was at its maximum with 24 processes. It should be noted in each iteration of the parallel version, each parallel process essentially runs the serial version of the algorithm, which requires reading both input files once, and writes out the merged file, once for each file assigned to that process. This is because the merged data are stored as one contiguous file, and provides further evidence of the performance gains that can be made with a partitioned file organization on a parallel infrastructure.

Query and Retrieval

The result of applying time-aware union to one or more instances is an instance that contains a concise and complete temporal history of all instances. The result instance, including the temporal contexts, is human readable, making it easy to visually explore the history of an entity, and machine readable, making it possible to explore the history of an entity by standard XML manipulation languages, such as XPath (see X.P.E. Language, XML Path Expression Language on the geneontology website).

Temporal query languages have been well-studied. While the focus of the current disclosure has been on the time-aware union operator, support for two important subclasses of temporal queries is also implemented in Chronicle: timeslice queries, whose purpose is to retrieve the state of an entity at a specific period of time, and range-timeslice queries, whose purpose is to retrieve the state of an entity or entities that satisfy a set of conditions at a specific period of time (see the paper to A. Kumar et al., "Access methods for bi-temporal databases," *Temporal Databases*, pp. 235-254, 1995). If the time period is a point in time t, then the results of such queries represent a snapshot of the data at time period t (see M. H. Bohlen et al., "Current semantics," In L. Liu et al., eds., *Encyclopedia of Database Systems*, pp. 544-545, Springer US, 2009).

A timeslice query can be posed through an XPath expression p that can include a vector v of time intervals as input, and returns an XML fragment that represents the set of all states of p during the time vector given by v as output. For example, suppose the schema shown in FIG. 4 was expanded to include the data shown on the right of FIG. 1, with a root node called person, which also included (time-aware) nodes for name, education and positions under person. Invoking the timeslice function with the XPath expression/person[name="Freddy Gold"]/stocksHeld@(asof=*-*, rep=*-*) returns an XML fragment that includes the stocks held by Freddy Gold from the past till now (the '@' indicates 'at' and '*-*' indicates an open time interval open on both ends). Concretely, the entire subtree under stocksHeld in the profile on the right of FIG. 4 will be returned in this case, including the ticker, number of shares, and the dates when those shares were held. On the other hand, the query/person[name="Freddy Gold"]/stocksHeld@(asof=8/22/10, rep=9/01/10) returns a snapshot of what stocks Freddy Gold held on 8/22/10 as reported on 9/01/10.

Range-timeslice queries return sets of entities that satisfy a condition. As an example, /person/position[title="CEO"]/name@(asof=12/31/05, rep=*-*)) returns names of active corporate CEOs on Dec. 31, 2005, which would include Freddy Gold.

Not all time dimensions must be specified in the XPath expression. The expression/person[name="Freddy Gold"]/stocksHeld@(asof=7/10/10)) returns an XML, fragment that shows the list of stock that Freddy Gold held on 7/10/10, regardless of when that information was reported. Similarly, the expression/person[name="Freddy Gold"]/stocksheld@(rep=08/22/10) will return all stocks that have been reported on 8/22/10 to be in Freddy Gold's portfolio, regardless of when the stock was actually held.

In the present invention's implementation, queries operate on coalesced temporal context which is dynamically computed as part of query processing, but it is straightforward to extend this to uncoalesced semantics. It is also useful to query the change history of an entity or set of entities in the instance. For example, it may be interesting to find the time periods in which an entity first appeared, and the time periods in which its values changed throughout its history. A context function enables a user to retrieve information on the temporal history of a subtree in the instance. The context function takes as input a path p, and returns the temporal context of each element in the subtree rooted at p. If no temporal context exists, then the temporal context of the nearest ancestor element that exists is inherited and returned. For example, context(/person/stocksHeld/stock) will return the key values and temporal context of each node in the subtree rooted at the/person/stocksHeld/stock node in FIG. 3. Additionally, the instance is stored as a contiguous file, and so the timeslice queries can be computed in a single scan of the instance, and execute in time proportional to the size of the instance. In addition to exploiting file partitioning and parallel execution frameworks for the time-aware union algorithm, it is also envisioned to extend variations of multi-dimensional index structures such as R-trees [23] to work efficiently with a multi-dimensional time-aware nested relational data model (see the paper to A. Kumar et al., "Designing access methods for bitemporal databases," *IEEE Trans. Knowl. Data Eng.*, 10(1):1-20, 1998).

Building a consistent profile of an entity from multiple data sources over time requires time-specific knowledge to be evolved and re-adjusted as new information is received.

Motivated by real world use cases, a new time-aware data model and union operator are introduced to use schema information and user-specified policies to identify and resolve time conflicts across data sources to produce a time-consistent, integrated profile. The time-aware union operator is idempotent, commutative, and associative, which ensures that it produces equivalent final results (modulo representation of time) regardless of the order data instances are integrated. The time-aware union has been demonstrated to be efficient, both in terms of storage and execution time, and lends itself well to parallelization. Finally, it has also been shown that timeslice query and retrieval are easily supported under the present invention's framework.

The victim policy determines which of two entities must be adjusted if they have a time conflict and the adjustment policy determines how to remove conflicting time points from the entity chosen as the victim. The appropriate policies by which to adjust conflicting time periods may depend on the semantics of the application, and different policies may produce different results. In FIG. 2, three possible policies were illustrated based on different interpretations of the SEC filings. Idempotent, commutativity, and associativity properties for the cumulative pairwise application of the policy will hold so long as the following properties hold for the victim policy (called favor( ) and the adjustment policy (called reduce( ):

Properties:
 0. if favor(x,y)==x, and favor(y,z)==y, then favor(x,z)=x
 1. if favor(x,y)==x, then favor(reduce(x,z1),reduce(y, z2)) ==x for every z1, z2
 2. reduce(reduce(y,z), x) is contained in reduce(y,x) for every z The cumulative pairwise application of the policies is order-independent if 0,1,2 are true.

Property 0 ensures a linear ordering of preferences and no cycles.

Property 1 ensures that the reduce( ) function cannot alter the information used to decide if a time record should be reduced relative to all other time records.

Property 2 ensures that the reduce function only removes time points. Thus, reduce(reduce(y,z),x)) for every z will always be equal to the smallest time record among all the time records associated with the z other elements.

FIG. 9 shows examples of victim policies that preserve the properties listed above, and FIG. 10 shows an example of the right-adjust policy. It should be noted that a left-adjust policy could be similarly defined.

The present invention, therefore, provides a computer-implemented method for processing a set of data records having time conflicts, the data records representing respective versions of an entity for which there can be only one preferred value at any given point in time, wherein each of the data records has an n-dimensional time record, the computer-implemented method comprising: defining a policy from among a plurality of candidate policies, the defined policy designed to resolve time conflicts between those data records having time conflicts; comparing all data records in a cumulative, pair-wise fashion; identifying time-based conflicts between pairs of records and identifying time-conflicted pairs; determining which record in every time-conflicted pair of records is to be adjusted in accordance with the defined policy; adjusting the time interval of every determined record to be adjusted in accordance with the defined policy; and outputting a modified set of data records having the adjusted time intervals, wherein (i) the modified set of data records contains no time conflicts and (ii) the adjusted time intervals in the modified set of data records do not depend on the order in which the data records are processed by the computer-implemented method.

The present invention also provide a computer based method comprising the steps of: receiving an input schema S; receiving two instances, $T_1$ and $T_2$, each of which conforms to the input schema, S; computing a merged instance of $T_1$ and $T_2$, $T_1 \uplus T_2$, as an instance that also conforms to S such that every path in $T_1$ or $T_2$ can be found in $T_1 \uplus T_2$, every path in $T_1 \uplus T_2$ can be found in $T_1$ or $T_2$, and a temporal context associated with an element in any path in $T_1 \uplus T_2$ is a result of adjusting temporal contexts of corresponding elements in $T_1$ and/or $T_2$ under the same path according to a given adjustment policy, the given adjustment policy designed to resolve time conflicts between data records having time conflicts, where the merged instance $T_1 \uplus T_2$ provides an integrated view of instances $T_1$ and $T_2$ by fusing identical elements in instances, $T_1$ and/or $T_2$ together and providing an interpretation of their corresponding temporal contexts according to the given adjust policy; and outputting the merged instance $T_1 \uplus T_2$.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system to components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

CONCLUSION

A system and method has been shown in the above embodiments for the effective implementation of a system and method of integrating time-aware data from multiple sources. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A computer based method comprising:
    receiving an input schema S;
    receiving two instances, $T_1$ and $T_2$, each of which conforms to said input schema, S;
    computing a merged instance of $T_1$ and $T_2$, $T_1 \uplus T_2$, as an instance that also conforms to S such that every path in $T_1$ or $T_2$ can be found in $T_1 \uplus T_2$, every path in $T_1 \uplus T_2$ can be found in $T_1$ or $T_2$, and a temporal context associated with an element in any path in $T_1 \uplus T_2$ is a result of adjusting temporal contexts of corresponding elements in $T_1$ and/or $T_2$ under the same path according to a given adjustment policy, said given adjustment policy designed to resolve time conflicts between data records having time conflicts, where said merged instance $T_1 \uplus T_2$ provides an integrated view of instances $T_1$ and $T_2$ by fusing identical elements in instances $T_1$ and/or $T_2$ together and providing an interpretation of their corresponding temporal contexts according to said given adjust policy;
    storing said merged instance $T_1 \uplus T_2$ as a time-consistent integrated profile; and
    evaluating a timeslice query based on the time-consistent integrated profile.

2. The computer-based method of claim 1, wherein said computer-based method is implemented as part of a parallel database system.

3. The computer-based method of claim 1, wherein said outputted merged instance $T_1 \uplus T_2$ is one among many intermediate results and said computer-based method further comprises the step of merging and outputting all said intermediate results.

4. The computer-based method of claim 1, wherein said outputted merged instance $T_1 \uplus T_2$ comprise a concise and complete temporal history of all data records such that a history of an entity associated with the data records is retrievable via a standard XML manipulation language.

5. The computer-based method of claim 4, wherein said standard XML, manipulation language is XPath.

\* \* \* \* \*